(12) United States Patent
Molloy et al.

(10) Patent No.: US 12,148,354 B2
(45) Date of Patent: Nov. 19, 2024

(54) SPREAD-SPECTRUM VIDEO TRANSPORT INTEGRATION WITH VIRTUAL REALITY HEADSET

(71) Applicant: HYPHY USA Inc., San Jose, CA (US)

(72) Inventors: Simon Molloy, South Australia (AU); Todd E. Rockoff, Holgate (AU)

(73) Assignee: HYPHY USA Inc., San Jose, CA (US)

( * ) Notice: Subject to any disclaimer, the term of this patent is extended or adjusted under 35 U.S.C. 154(b) by 43 days.

(21) Appl. No.: 17/946,479

(22) Filed: Sep. 16, 2022

(65) Prior Publication Data

US 2023/0091412 A1    Mar. 23, 2023

Related U.S. Application Data

(60) Provisional application No. 63/346,064, filed on May 26, 2022, provisional application No. 63/317,336, (Continued)

(51) Int. Cl.
*G09G 3/20* (2006.01)
*G06F 3/01* (2006.01)
(Continued)

(52) U.S. Cl.
CPC ........... *G09G 3/2096* (2013.01); *G06F 3/016* (2013.01); *G09G 3/003* (2013.01); *H04N 7/20* (2013.01);
(Continued)

(58) Field of Classification Search
CPC .... G09G 3/2096; G09G 3/3275; G09G 3/001; G09G 3/003; G09G 3/3685;
(Continued)

(56) References Cited

U.S. PATENT DOCUMENTS

| 3,204,035 A | 8/1965 | Ballard et al. |
| 3,795,765 A | 3/1974 | DeGroat et al. |

(Continued)

FOREIGN PATENT DOCUMENTS

| CN | 101933277 | 12/2010 |
| CN | 101969319 | 2/2011 |

(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.
(Continued)

*Primary Examiner* — Xilin Guo
(74) *Attorney, Agent, or Firm* — Beyer Law Group LLP

(57) ABSTRACT

A video stream is encoded using spread spectrum video transport and sent as an analog signal to a display of a VR visor where a decoder integrated with a source driver decodes the analog signal and drives the display. The analog signal is sent wirelessly to the display where it is received, converted to wired format, decoded and displayed. A wireless SSVT analog signal is received at the headset processor and forwarded to the VR visor for reception, conversion, decoding and display. A wireless SSVT analog signal is received at the processor, converted to wired format, sent wirelessly to the display where it is received at a receiver, converted to wired format, decoded and displayed. A video stream is stored in persistent storage on the headset processor using SSVT encoding. The decoder integrated with a source driver of a display is implemented directly on the glass of the display panel.

21 Claims, 18 Drawing Sheets

Related U.S. Application Data filed on Mar. 7, 2022, provisional application No. 63/299,137, filed on Jan. 13, 2022, provisional application No. 63/280,017, filed on Nov. 16, 2021, provisional application No. 63/245,650, filed on Sep. 17, 2021.

(51) Int. Cl.
  *G09G 3/00* (2006.01)
  *H04N 7/20* (2006.01)
  *H04B 1/69* (2011.01)

(52) U.S. Cl.
  CPC ............... *G09G 2310/0275* (2013.01); *G09G 2310/0291* (2013.01); *G09G 2354/00* (2013.01); *G09G 2360/04* (2013.01); *G09G 2370/08* (2013.01); *G09G 2370/16* (2013.01); *G09G 2370/20* (2013.01); *H04B 1/69* (2013.01)

(58) Field of Classification Search
  CPC ........... G09G 2370/20; G09G 2340/02; G09G 2370/08; G09G 2310/027; G09G 2310/0291; G09G 2370/16; G09G 2360/04; G09G 2354/00; G09G 2310/0275; G09G 5/14; G09G 2340/10; G09G 2340/125; G09G 2340/0407; G09G 5/12; H04B 1/707; H04B 1/69; H04J 13/004; G06F 3/011; G06F 3/016; H04N 7/20; H04N 19/176; H04N 19/70; H04N 19/46; H04N 19/52; H04N 9/8042; H04N 19/61; G06T 9/007; G06T 9/00; G06T 1/20; G06T 2207/10016; G06T 7/215
  See application file for complete search history.

(56) References Cited

U.S. PATENT DOCUMENTS

| | | | |
|---|---|---|---|
| 5,793,759 A | 8/1998 | Rakib et al. | |
| 5,796,774 A | 8/1998 | Kato | |
| 5,870,414 A | 2/1999 | Chaib et al. | |
| 5,936,997 A | 8/1999 | Kanda | |
| 5,938,787 A | 8/1999 | Stark et al. | |
| 5,956,333 A | 9/1999 | Zhou et al. | |
| 5,966,376 A | 10/1999 | Rakib et al. | |
| 6,018,547 A | 1/2000 | Arkhipkin | |
| 6,128,309 A | 10/2000 | Tariki et al. | |
| 6,154,456 A | 11/2000 | Rakib et al. | |
| 6,289,039 B1 | 9/2001 | Garodnick | |
| 6,310,923 B1 | 10/2001 | Lee et al. | |
| 6,456,607 B2 | 9/2002 | Arai et al. | |
| 6,480,559 B1 | 11/2002 | Dabak et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,027,102 B2* | 4/2006 | Sacca ...................... | H04N 9/64 348/E9.037 |
| 7,710,910 B2 | 5/2010 | Ode et al. | |
| 7,793,022 B2 | 9/2010 | Travers et al. | |
| 7,796,575 B2 | 9/2010 | Lim et al. | |
| 7,873,097 B1 | 1/2011 | Luecke et al. | |
| 7,873,980 B2 | 1/2011 | Horan et al. | |
| 7,908,634 B2 | 3/2011 | Keady et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 | 12/2018 | Hannebauer et al. | |
| 10,763,914 B2 | 9/2020 | Hannebauer et al. | |
| 10,891,905 B1 | 1/2021 | Liu et al. | |
| 11,025,292 B2 | 6/2021 | Hannebauer et al. | |
| 11,394,422 B2 | 7/2022 | Hannebauer et al. | |
| 11,463,125 B2 | 10/2022 | Hannebauer et al. | |
| 11,716,114 B2 | 8/2023 | Hannebauer | |
| 2002/0013926 A1 | 1/2002 | Kim et al. | |
| 2002/0097779 A1 | 7/2002 | Bang et al. | |
| 2002/0154620 A1 | 10/2002 | Azenkot et al. | |
| 2003/0139178 A1 | 7/2003 | Uesugi et al. | |
| 2004/0120415 A1 | 6/2004 | Song et al. | |
| 2005/0069020 A1 | 3/2005 | Lakkis | |
| 2005/0243956 A1* | 11/2005 | Fernald ................. | G09G 5/008 375/355 |
| 2008/0056357 A1* | 3/2008 | Chan ........................ | H04N 5/14 348/E5.062 |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0061698 A1* | 3/2010 | Morello ............ | H04N 21/4382 386/207 |
| 2010/0091990 A1 | 4/2010 | Etemad et al. | |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2011/0169870 A1 | 7/2011 | Yang et al. | |
| 2012/0014464 A1 | 1/2012 | Eiger et al. | |
| 2012/0047229 A1 | 2/2012 | Bennett | |
| 2013/0194284 A1 | 8/2013 | Bi | |
| 2014/0218616 A1 | 8/2014 | Toba et al. | |
| 2014/0340431 A1 | 11/2014 | Yamakawa | |
| 2016/0127087 A1 | 5/2016 | Feher | |
| 2019/0174027 A1 | 6/2019 | Lv et al. | |
| 2019/0260629 A1 | 8/2019 | Nikopour et al. | |
| 2019/0342564 A1 | 11/2019 | Kurokawa | |
| 2020/0043440 A1 | 2/2020 | Qiu et al. | |
| 2020/0336730 A1 | 10/2020 | Kim et al. | |
| 2021/0223864 A1 | 7/2021 | Forsland et al. | |
| 2022/0062766 A1* | 3/2022 | Dom ....................... | H04S 7/304 |
| 2022/0302953 A1 | 9/2022 | Hannebauer et al. | |
| 2022/0397931 A1 | 12/2022 | Song et al. | |
| 2023/0223981 A1 | 7/2023 | Hannebauer | |
| 2023/0230559 A1 | 7/2023 | Friedman | |

FOREIGN PATENT DOCUMENTS

| | | |
|---|---|---|
| CN | 101917209 | 7/2015 |
| EP | 0 727 881 | 8/1996 |
| EP | 1 079 536 | 2/2001 |
| EP | 1 968 324 | 9/2008 |
| JP | 08293818 | 11/1996 |
| JP | H09312590 | 12/1997 |
| JP | 2001-144653 | 5/2001 |
| JP | 2001510658 | 7/2001 |
| JP | 2007-150971 | 6/2007 |
| KR | 10-2019-0069231 | 6/2019 |
| WO | WO 97/02663 | 1/1997 |
| WO | WO 98/52365 | 11/1998 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heijden, "An Analog Correlator for a High Speed DS-CDMA Modem", Eindhoven University of Technology, Department

(56) References Cited

OTHER PUBLICATIONS of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

International Search Report and Written Opinion dated Jan. 12, 2023 from International Application No. PCT/US2022/043799.

\* cited by examiner

FIG. 7 SSVT Receiver Integrated with Source Drivers of Display

Encoding of Digital Values

US 12,148,354 B2

SPREAD-SPECTRUM VIDEO TRANSPORT INTEGRATION WITH VIRTUAL REALITY HEADSET

CROSS-REFERENCE TO RELATED APPLICATIONS

This application claims priority of U.S. provisional patent application No. 63/245,650 (HYFYP010P), filed Sep. 17, 2021, entitled "Spread Spectrum Video Transport and AR/VR Headset Processor," U.S. provisional application No. 63/299,137 filed on Jan. 13, 2022, U.S. provisional application No. 63/280,017 filed on Nov. 16, 2021, U.S. provisional application No. 63/317,336 filed on Mar. 7, 2022, and U.S. provisional application No. 63/346,064 filed on May 26, 2022, which are all hereby incorporated by reference.

This application also incorporates by reference U.S. application Ser. No. 15/925,123, filed on Mar. 19, 2018, U.S. application Ser. No. 16/494,901 filed on Sep. 17, 2019, U.S. application Ser. No. 17/879,499 filed on Aug. 2, 2022, U.S. application Ser. No. 17/686,790, filed on Mar. 4, 2022, U.S. application Ser. No. 17/887,849 filed on Aug. 15, 2022, U.S. application Ser. No. 17/851,821, filed on Jun. 28, 2022, U.S. application No. 63/398,460 filed on Aug. 16, 2022, U.S. application Ser. No. 17/900,570 filed on Aug. 31, 2022, U.S. application No. 63/391,226, filed on Jul. 21, 2022.

FIELD OF THE INVENTION

The present invention relates generally to virtual reality headsets. More specifically, the present invention relates to transport of video signals within a headset and to and from a headset.

BACKGROUND OF THE INVENTION

Image sensors, display panels, and video processors are continually racing to achieve larger formats, greater color depth, higher frame rates, and higher resolutions. Local-site video transport includes performance-scaling bottlenecks that throttle throughput and compromise performance while consuming ever more cost and power. Eliminating these bottlenecks can provide advantages.

Until now, data is transferred within a VR headset and to and from that headset using digital video signals. This digital information then needs to be transferred to analog pixel information on-the-fly using D-to-A conversion at the source drivers of the displays. Transport using digital video signals requires compression, means higher power consumption (generating extra heat), more EMI emissions, greater latency and struggles to provide the color depth, high frame rates and high resolution desired. Latency—the time required to perform all of the computation needed for digital transport— is a particularly critical concern in VR systems in that any user-perceptible delays can induce nausea and make the system unusable. In addition, D-to-A conversion at the source drivers requires more space and expense.

What is desirable is a VR headset that uses an improved technique for video transport that addresses the above concerns.

SUMMARY OF THE INVENTION

To achieve the foregoing, and in accordance with the purpose of the present invention, a virtual reality (VR) headset is disclosed that uses an improved video transport technique.

In one embodiment, a video stream at a VR headset processor is encoded using a spread spectrum video transport (SSVT) technique and is sent as an SSVT analog signal to a display or displays of the VR visor where a decoder integrated with a source driver decodes the SSVT analog signal and drives the display with the original video stream. Multiple displays may be driven in the same manner.

In a second embodiment, after the video stream is encoded at the headset processor, the SSVT analog signal is sent wirelessly to the display or displays of the visor where it is received at a wireless receiver, converted back to wired format, and then decoded and displayed.

In a third embodiment, a wireless SSVT analog signal is received at the headset processor and then forwarded to the VR visor for reception, conversion, decoding and display.

In a fourth embodiment, a wireless SSVT analog signal is received at the headset processor, converted back to wired format, sent wirelessly to the display or displays of the visor where it is received at a wireless receiver, converted back to wired format, and then decoded and displayed.

In a fifth embodiment, a video stream is stored in persistent storage on the headset processor using SSVT encoding. The stored analog data may then be read from persistent storage, decoded and then transmitted from storage as the original video stream.

In a sixth embodiment, the decoder integrated with a source driver of a display of the VR visor is implemented directly on the glass of the display panel. A portion of, or all of, the decoder integrated with the source driver may be implemented upon the TFT display substrate.

In one embodiment, a virtual reality (VR) headset comprises: a headset processor including a transmitter arranged to receive a stream of video samples, to continuously encode sets of N of said video samples each into a set of L output levels, and to transmit said sets of L output levels as an analog waveform over an electromagnetic pathway, wherein $L>=N>=2$; and a VR visor including at least one display having at least one source driver, said source driver including a receiver arranged to receive said sets of L output levels of said analog waveform from said transmitter, a decoder arranged to decode each set of said L output levels into an output vector of N analog samples, a buffer arranged to collect said output vectors of N analog samples each from said decoder, and to output said output vectors of N analog samples in parallel, each of said analog samples being output to a column of said display, wherein said stream of video samples are substantially displayed on said display. The display includes C columns, wherein said sets of L output levels are received serially at a frequency freq(SSVT), wherein each of said output vectors of N analog samples are output from said decoder at a frequency freq(sample)=freq (SSVT)/N, and wherein said buffer outputs said output vectors of N analog samples in parallel at a frequency freq(line)=freq(sample)×N/C.

The invention applies encoding techniques to uncompressed video samples; the resulting compression-free video transport enables advanced virtual reality displays. Advantages include: negligible latency (one reason being that compression of a video signal is not required); low display chipset power consumption (less heat, longer battery life, lighter, less expensive, more robust cabling); greater field of view; greater color depth; high frame rates and resolutions; increased noise immunity; ready EMI emissions compliance; longer signal reach; greater video throughput; and SWaP-C advantages (size, weight, power and cost). The invention is especially applicable to displays used in VR headsets such as LCD and OLED panels. The advantage of low power consumption is particularly important for "untethered" VR systems which rely on batteries in the headset itself for power rather than on a cable to which the headset is tethered. With respect to the video throughput advantage, a wider field of view (usually expressed in degrees) provides a more immersive experience, but this wider field of view requires more video information; therefore higher throughput also enables a greater field of view.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

It is realized that digitization of the video signal intended for a virtual reality (VR) visor may take place at the signal source of the system (e.g., at the GPU in the headset processor); then, the digital signal is transferred to the displays in the visor, where the digital signal is returned to analog again, to be loaded onto the displays. Or, the video content of a system may be originally digital. So, the only purpose of this digital signal is data transfer to displays of the visor. Therefore, we realize that it is much more beneficial to avoid digitization or digital signals altogether and directly transfer the analog data from video source to the displays. This can be done using SSVT encoding, leading to accurate analog voltages to be decoded again in the display drivers. The analog data has high accuracy, so there is no need for high bit-depth. This means the sample rate is at least a factor of ten lower than in the case of digital data transfer, leaving further bandwidth for expansion.

Thus, instead of transporting a digital signal from the video source all the way to the location where the analog signal needs to be generated, we transport the analog signal to the display over a very much lower sample rate than one would normally have with digitization. That means that instead of having to send Gigabits per second over a number of lines, we can now do with only a few mega samples per second in case of the analog signal, thus reducing the bandwidth of the channel that has to be used. Further, with prior art digital transport, every bit will occupy about 1.25 cm, whereas transporting analog data results in an increase of tenfold amount of space available, meaning extra bandwidth available. More precisely, the SSVT technique describe herein enables ten time higher video throughput for any given set of conductors (e.g., wires or cables) and transport clock rates. Converting digital video signals into SSVT at a source (or other location) therefore enables transmission of ten times more video information to the VR headset or to the visor itself, other factors remaining equal. This ten times greater video information can be allocated to any of the desired improvements in headset performance resolution, colour bit depth, refresh rates, field of view, etc.

And further, a bit in digital data has to be well defined. This means that digital transport is fairly sensitive to errors and noise, and one needs to be able to detect the high point and the low point very accurately. Whereas, with the proposed analog transport it is much less sensitive. That means that the quality of the cable does not need to be high.

Virtual Reality Headset Overview

Figure 1:
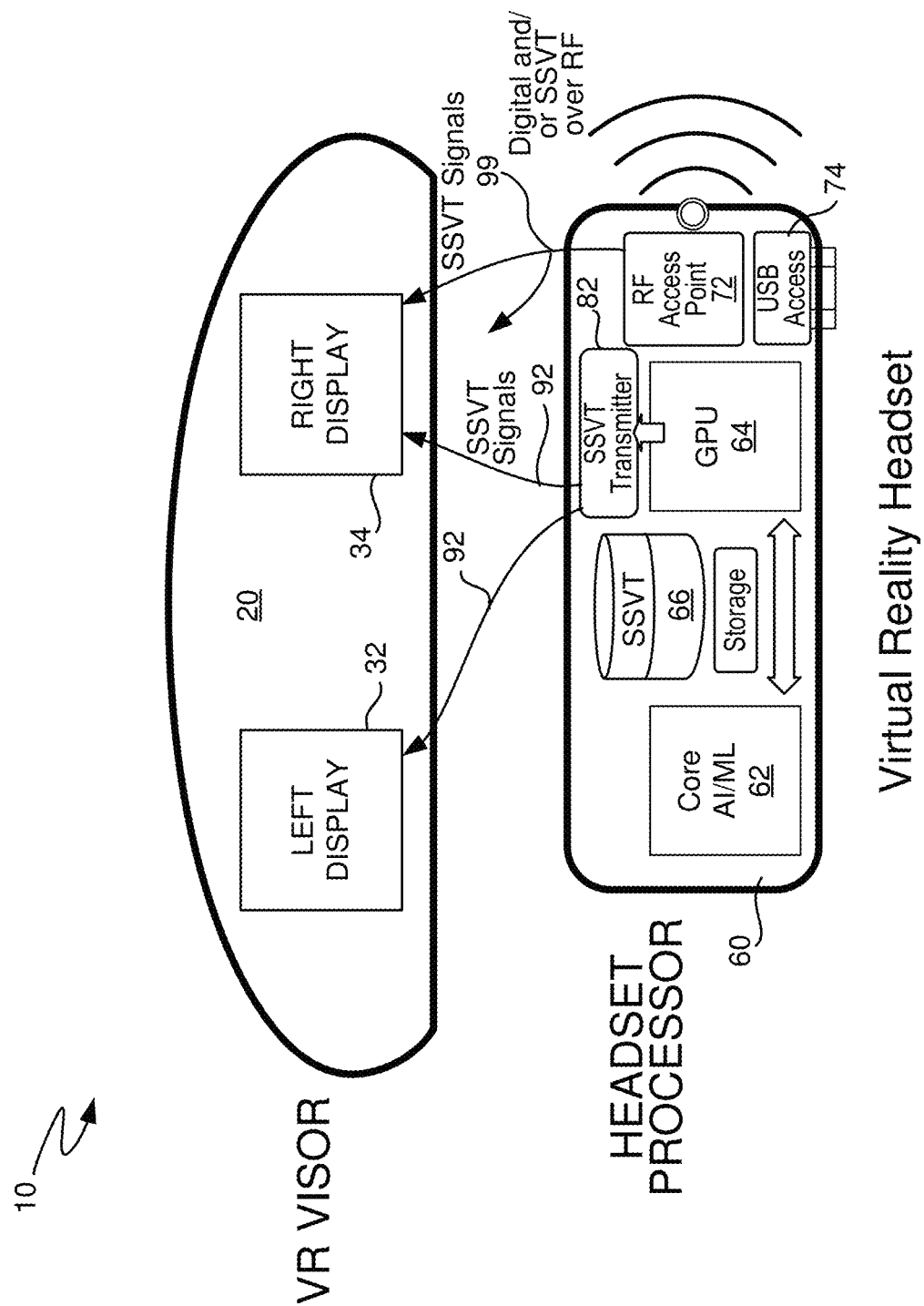
FIG. 1 illustrates a virtual-reality (VR) headset that embodies various aspects of the present invention.

FIG. 1 illustrates a virtual-reality (VR) headset 10 that embodies various aspects of the present invention. As discussed in more detail below, headset 10 may be used as a VR headset (in which the user views computer-generated images). Accordingly, the headset may be referred to as a VR headset or simply as the headset.

As known in the art, a VR headset is typically worn on the head of the user and includes a visor 20 that covers the user's eyes and a processor 60 typically integrated with the visor or mounted on the back of the user's head. Visor 20 has a left display 32 and a right display 34 for displaying the virtual-reality images or augmented-reality images to the user. Once the left and right displays receive the images to be seen by the user, different techniques may be used to display those images to the user. In one straightforward technique, left and right displays 32 and 34 are placed in front of the user's eyes. In another technique, typically referred to as a heads-up display (HUD), displays 32 and 34 are not viewed directly by the user; rather, their images are projected and reflect off of a glass or other surface within the visor in front the user's eyes.

Processor 60 includes a core AI/ML module 62 (including a processor for executing artificial intelligence or machine learning applications, as well as other suitable processors, programs, memory, etc.), a GPU 64, SSVT storage 66 and any suitable interface to the outside world such as an RF access point 72 used to communicate wirelessly (using digital or SSVT signals) with a network, the Internet, other computers, etc. A USB port 74 may also be provided to communicate with another computer. Processor 60 may be mounted on the user's head and communicate with visor 20 via wires, cables or wirelessly. Or, processor 60 may be mounted anywhere else on the user's body (such as in a backpack or on a belt) or may be remote from the user (such as in a nearby computer, vehicle, building, etc.) and communicates with the visor 20 wirelessly.

During operation, headset 10 provides numerous advantages (such as less heat dissipation, less power consumption, greater noise immunity, fewer EMI emissions, negligible latency, greater image quality, etc., by using the novel spread spectrum video transport (SSVT) technique to transport video signals to the visor from the processor, as well as to transport video signals between the processor and another computer wirelessly.

As shown, an SSVT transmitter 82 within the processor transmits an SSVT signal 92 to each of displays 32 and 34 using either a wired or a wireless connection. A technique for inputting a digital video signal, transmitting an SSVT signal to a display and integrating source drivers of that display with decoding of the SSVT signal is described in U.S. patent application Ser. No. 17/900,570 incorporated by reference above.

VR visor may include only a single display, in which case SSVT transmitter 92 sends a single SSVT signal 92 to that single display. In the case of multiple displays (most often, two displays), there may be two (or multiple) SSVT transmitters 82, each receiving a video stream from GPU 64 (or from a VR bridge, a video board, a combined SoC/TCON/GPU, video splitter, etc., depending upon the implementation of the particular VR headset) and each transmitting an SSVT signal 92 to each of the displays 32 and 34. Typically, the video stream sent to each SSVT transmitter will be the same video stream in order to display the same images in front of each eye, although depending upon the implementation, the video stream sent to each SSVT transmitter may be different.

In an alternative embodiment in which only a single SSVT transmitter 82 is used, the input will be a single video stream and the output from each encoder or encoders (i.e., each EM Signal) will be split or duplicated and transmitted to each of the two display panels. One of skill in the art will find it straightforward to split or duplicate a signal in order to send the same synchronized signal to two display panels. In this embodiment, each panel will display the same images based upon the input video stream.

As mentioned above, any of the SSVT signals shown in FIG. 1 may be sent wirelessly. By way of example, SSVT signal 92, SSVT signal 94, or even any SSVT signal sent over interface 72 or 74 may be a wireless SSVT signal. A technique for implementing a wireless SSVT signal is described in U.S. patent application No. 63/299,137 incorporated by reference above and is described below. By way of example, if an SSVT wireless signal is received at RF access point 72 it may be relayed directly and wirelessly 99 to each of displays 32 and 34 for display of its encoded video signal as is herein described. Or, the wireless SSVT signal received at point 72 may be received by wireless receiver 206, converted into (P) wired SSVT EM signals as described, and then those (P) SSVT EM signals may be input into wireless transmitter 202 for wireless transmission 99 to displays 32 and 34. Or, the (P) wired SSVT EM signals may be delivered via a wired cable or fiber cable 99 to both displays.

Further, processor 60 may also include SSVT storage 66 which stores video or other data in a technique using an SSVT representation. A technique for implementing SSVT storage 66 is described in U.S. patent application Ser. No. 17/887,849 incorporated by reference above.

In addition, the integrated decoder with source driver described below may be fully or partially implemented directly upon the glass of either or both displays 32, 34 as described in U.S. patent application No. 63/346,064 incorporated by reference above.

SSVT Transmitter Integration Embodiments

Below are various embodiments describing various levels of integration of an SSVT transmitter 82 with a GPU 64. These embodiments provide the advantages discussed above. In each of these embodiments below, an SSVT signal is generated within processor 60 near GPU 64 and then delivered to source drivers of displays 32, 34 for displaying video data. Compared to conventional digital video transport techniques, these embodiments provide greater reach, greater noise immunity and use less power (depending upon the level of integration).

Figure 2:
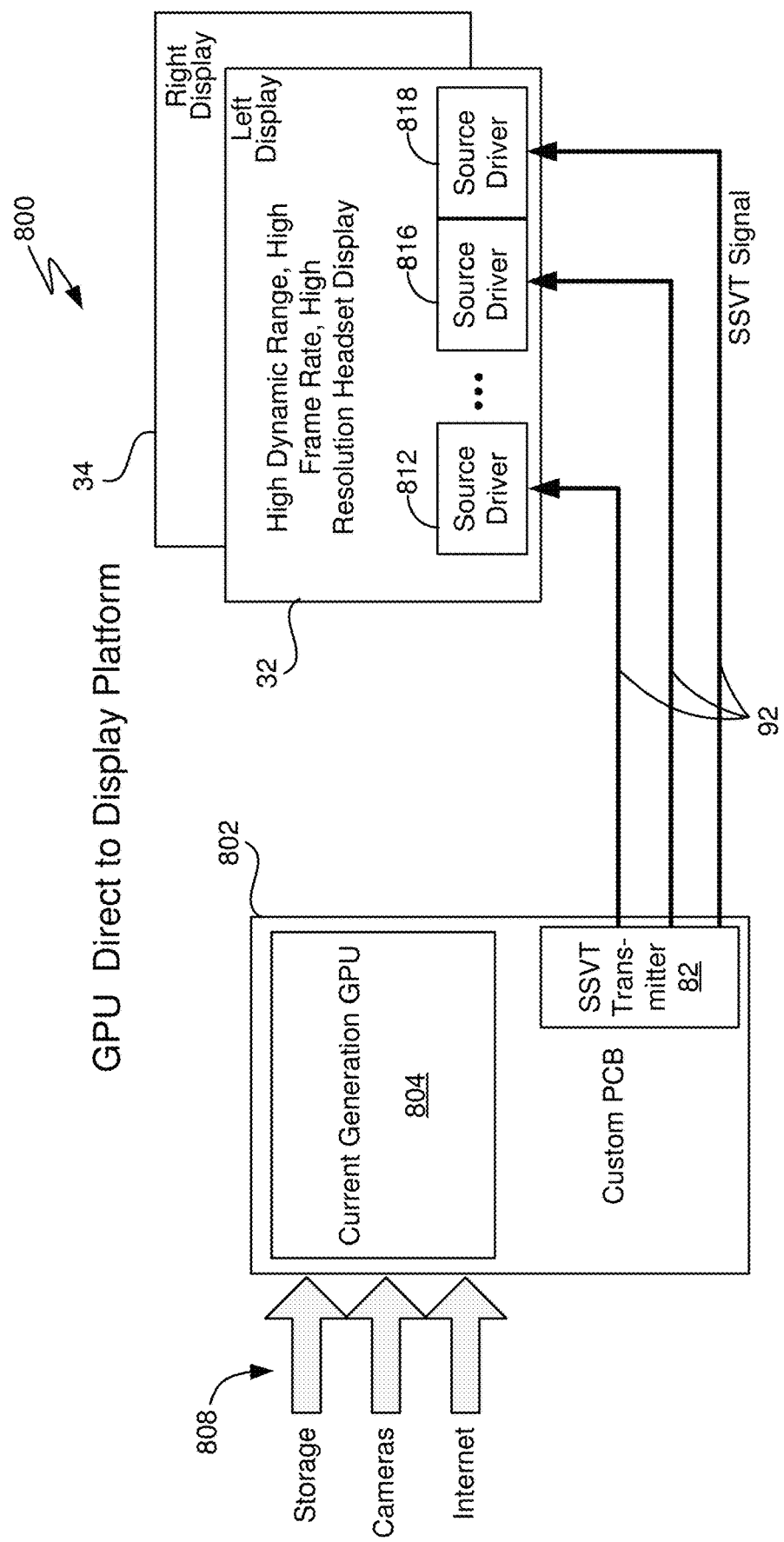
FIG. 2 illustrates a GPU Direct-to-Display Platform embodiment.

FIG. 2 illustrates a GPU Direct-to-Display Platform embodiment 800 in which the platform is a custom printed circuit board 802 that includes a current generation (or "legacy") GPU IC 804 as well as an SSVT transmitter IC 82. In this embodiment, the SSVT transmitter is not integrated within the GPU. Video data is received from storage, cameras, Internet, core 62, etc., 808 and is processed by GPU 804 before being converted and encoded into an SSVT signal 92 by SSVT transmitter 82. This signal is then transported over any suitable EM pathway (physical wires, radio frequency or fiber-optic cable) to displays 32, 34 where the signal is delivered to each of source drivers 812-818 and then decoded and displayed on a display panel as explained herein. The display may include any suitable display for a headset. This PCB-level integration embodiment uses 20% less power compared to conventional techniques.

Figure 3:
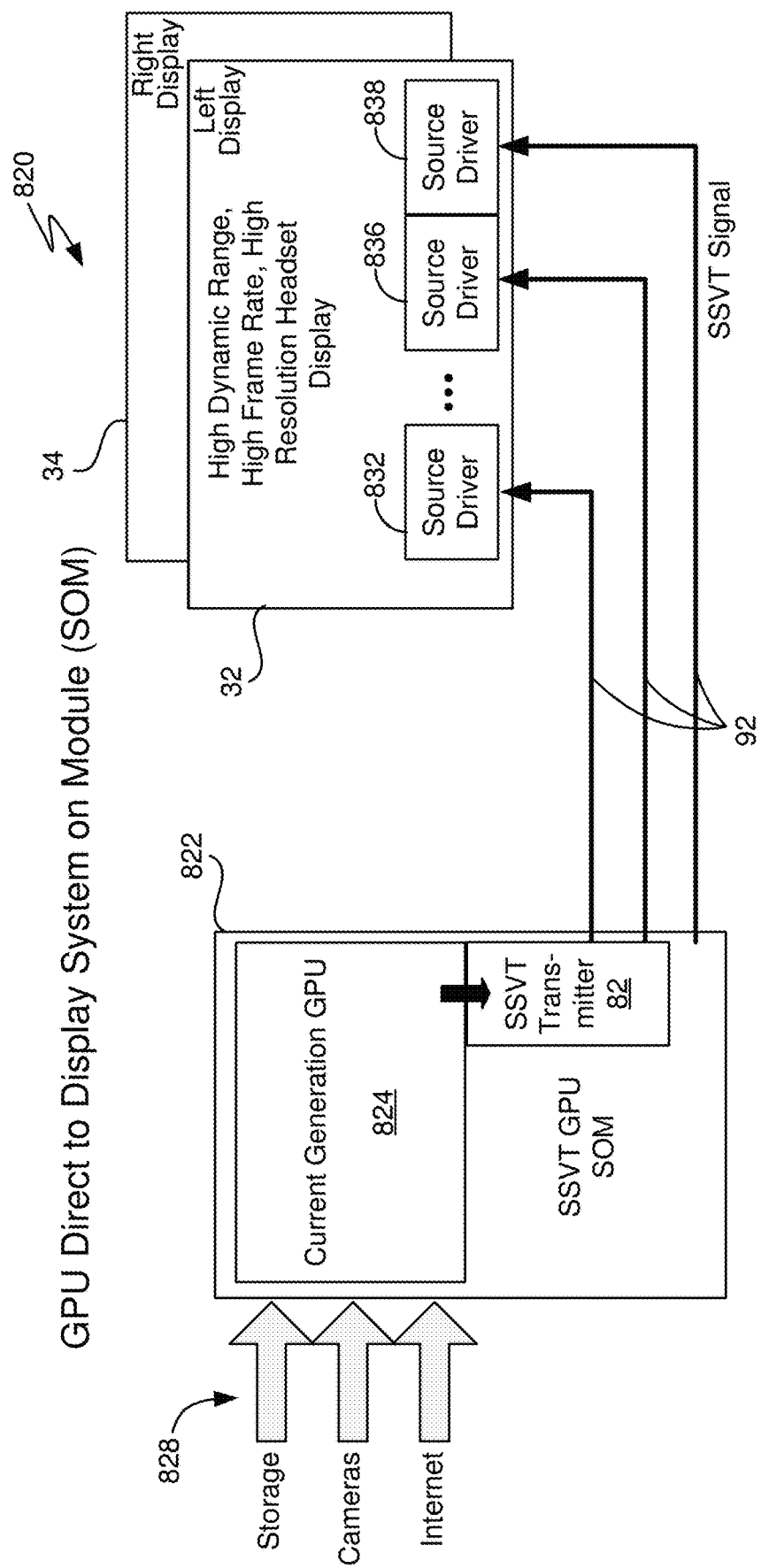
FIG. 3 illustrates a GPU Direct-to-Display System-on-Module (SoM) embodiment.

FIG. 3 illustrates a GPU Direct-to-Display System-on-Module (SoM) embodiment 820 in which the SoM 822 includes a current generation GPU IC 824 as well as an SSVT transmitter IC 82; the ICs may be known-good-dies (KGDs). In this embodiment, the SSVT transmitter is not integrated within the GPU. Video data is received from storage, cameras, Internet, core 62, etc., 828 and is processed by GPU 824 before being converted and encoded into an SSVT signal 92 by SSVT transmitter 82. This signal is then transported over any suitable EM pathway (physical wires, radio frequency or fiber-optic cable) to displays 32, 34 where the signal is delivered to each of source drivers 832-838 and then decoded and displayed on a display panel as explained herein. The display may include any suitable display for a headset. This higher-level integration embodiment uses 50% less power compared to conventional techniques.

Figure 4:
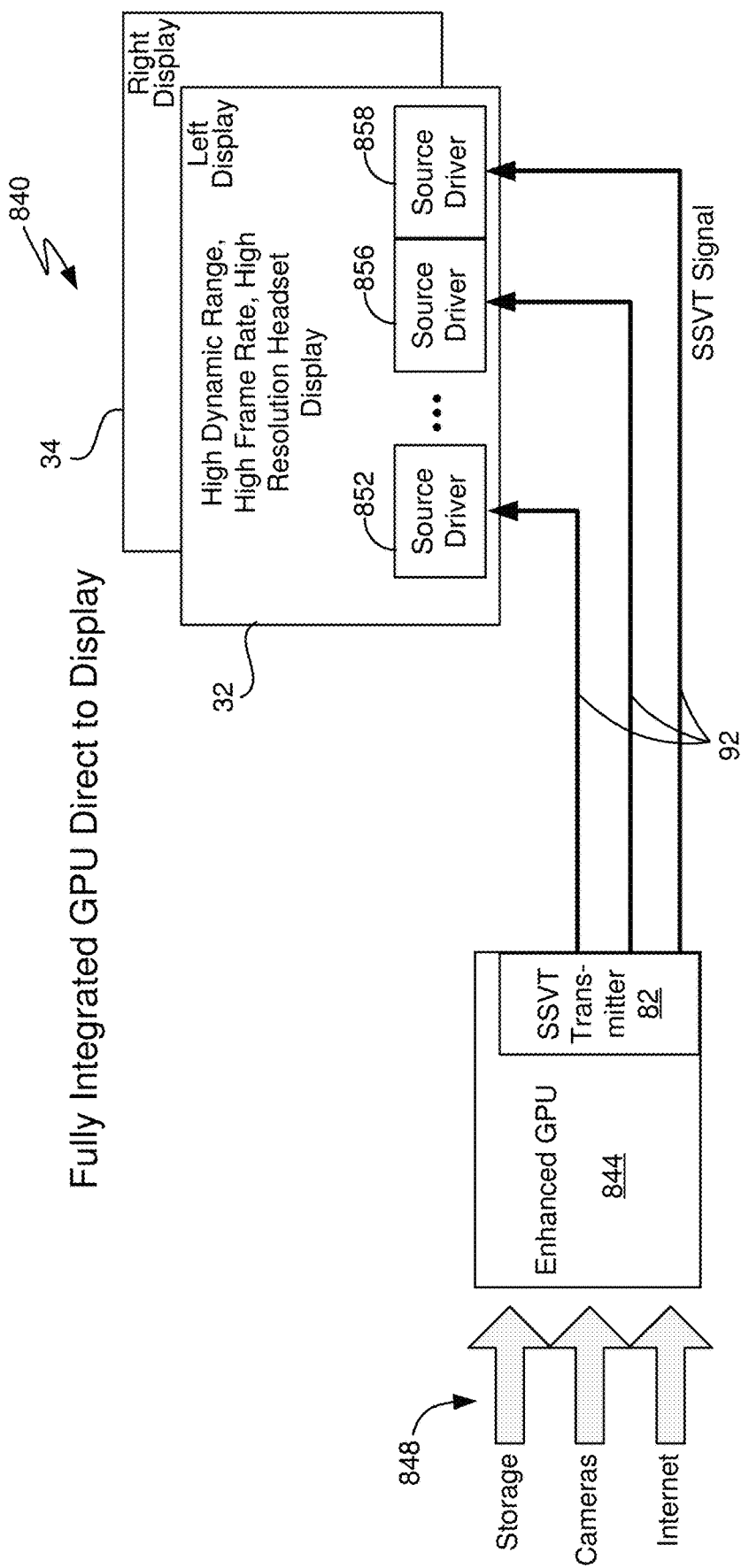
FIG. 4 illustrates a Fully Integrated GPU Direct-to-Display embodiment.

FIG. 4 illustrates a Fully Integrated GPU Direct-to-Display embodiment 840 in which an enhanced GPU 844 includes a fully integrated SSVT transmitter 82 within the GPU die. Video data is received from storage, cameras, Internet, core 62, etc., 848 and is processed by GPU 844 before being converted and encoded into an SSVT signal 92 by SSVT transmitter 82. This signal is then transported over any suitable EM pathway (physical wires, radio frequency or fiber-optic cable) to displays 32, 34 where the signal is delivered to each of source drivers 852-858 and then decoded and displayed on a display panel as explained herein. The display may include any suitable display for a headset. This highest-level integration embodiment uses 60% less power compared to conventional techniques. Further, the GPU has an SSVT transmitter integrated into the same piece of silicon. Thus, all digital transport is happening within a very short distance and, therefore, a high data rate on a single chip is not as important.

SSVT Transmitter

Figure 5:
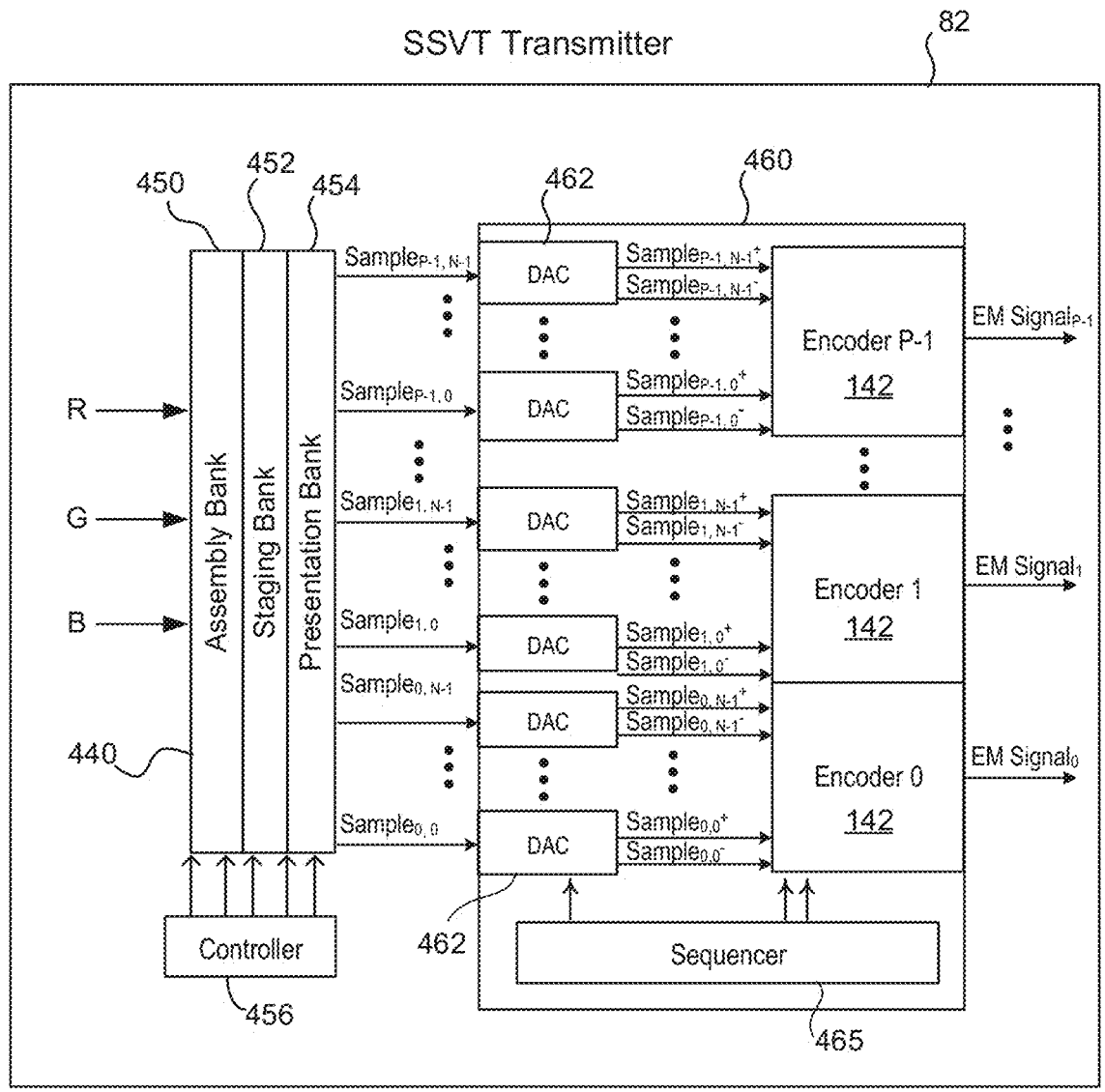
FIG. 5 is a block diagram of SSVT transmitter.

FIG. 5 is a block diagram of SSVT transmitter 82. As discussed herein, the output of the encoders 142 (EM signals 0 through P−1) is onto a transmission medium such as cable, optical fiber, wireless, etc. The distributor 440 includes an assembly bank 450, a staging bank 452, a presentation bank 454 and a controller 456. An encoder block 460 includes a bank of digital-to-analog converters (DACs) 462 and any number P of encoders 142, one for each EM pathway for sending an EM signal on a transmission medium.

During operation, a stream of time-ordered video samples containing color values and pixel-related information is received from a video source at the GPU 64 and delivered to the SSVT transmitter 82 via an SoC and TCON (both not shown). The number and content of the input video samples received from the video source depends upon the color space in operation at the source (and, the samples may be in black and white). Regardless of which color space is used, each video sample is representative of light in the designated color space.

As a stream of input video samples is received within assembly bank 450, the input video samples are repeatedly (1) distributed by assigning the samples to encoder input vectors according to a predetermined permutation (one vector per encoder) and (2) encoded by applying an SSDS-based modulation to each of input vectors using orthogonal codes in order to generate multiple composite EM signals, one analog signal from each encoder. The EM signals are then transmitted (3) over a transmission medium, one signal per pathway.

For purposes of explanation, one possible permutation implemented by a distributor for building four vectors $V_0$, $V_1$, $V_2$ and $V_3$ (assuming four encoders, P=4) is one in which each of the vectors includes N samples of color information. In this example, the exposed color information for the sets of samples is "RGB" respectively. The exposed RGB samples of the sets of samples are assigned to vectors $V_0$, $V_1$, $V_2$ and $V_3$ from left to right. In other words, the "R", "G" and "B" values of the first sample and the "R" signal of the next set of samples are assigned to vector $V_0$, whereas the next (from left to right) "G", "B", "R" and "G" values are assigned to vector $V_1$, the next (from left to right) "B", "R", G" and "B" values are assigned to vector $V_2$, and the next (from left to right) "R", "G", "R" and "R" values are assigned to vector $V_3$. Once the fourth vector $V_3$ has been assigned its samples, the above process is repeated until each of the four vectors $V_0$, $V_1$, $V_2$ and $V_3$ have N samples. In various embodiments, the number of N samples may widely vary.

By way of example, consider an embodiment with N=60. In this case, the total number of N samples included in the four vectors $V_0$, $V_1$, $V_2$ and $V_3$ is 240 (60×4=240). The four encoder input vectors $V_0$, $V_1$, $V_2$ and $V_3$, when completely built up, include the samples (where S=3) for 80 distinct sets of samples (240/3=80). In other words:

Vector $V_0$ includes Samples $P_0$, $N_0$ through $P_0$, $N_{N-1}$;
Vector $V_1$ includes Samples $P_1$, $N_0$ through $P_1$, $N_{N-1}$;
Vector $V_2$ includes Samples P2, $N_0$ through $P_2$, $N_{N-1}$; and
Vector $V_3$ includes Samples P3, $N_0$ through P3, $N_{N-1}$.

It should be understood that the above example is merely illustrative and should not be construed as limiting. The number of samples N may be more or less than 60. Also, it should be understood that the exposed color information for each set of samples can be any color information (e.g., Y, C, Cr, Cb, etc.) and is not limited to RGB. The number of EM pathways over the transmission medium can also widely vary. Accordingly, the number of vectors V and the number of encoders may also widely vary from one to any number larger than one. It should also be understood that the permutation scheme used to construct the vectors, regardless of the number, is arbitrary. Any permutation scheme may be used.

The distributor 440 is arranged to receive the exposed color information (e.g., RGB) for the stream of sets of samples, one after the other. In response, the assembly bank 450 builds the vectors $V_0$, $V_1$, $V_2$ and $V_3$ from the exposed color information for the incoming stream of sets of samples. As the sets of samples are received, they are stored in the assembly bank 450 according to a predetermined permutation.

The staging bank 452 facilitates the crossing of the N samples of each of the four vectors $V_0$, $V_1$, $V_2$ and $V_3$ from a first clock frequency (or first timing domain) used by a retimer into a second clock frequency (or second domain) used for the encoding and output of the resulting analog output levels. Using the example with N=60 and S=3, the samples representing exactly 80 sets of RGB samples are contained in the four encoder input vectors $V_0$, $V_1$, $V_2$ and $V_3$.

In various embodiments, the first clock frequency can be faster, slower or the same as the second clock frequency. The first clock frequency f_pix is determined by the video format selected by a video source. The second clock frequency f_ssvt is a function of f_pix, the number P of EM pathways in the transmission medium, the number S of samples in each set of input/output samples, and the SSVT transform parameters N (the number of input/output vector locations) and L (the length of each SSDS code), where f_ssvt= (f_pix*S*L)/(P*N). With this arrangement, the input clock (pix_clk) oscillates at one rate, and the SSVT clock (ssvt-_clk) oscillates at another rate. These rates can be the same or different. An encoder performs the encoding while the next input vector is prepared. The presentation bank 454 presents the N samples of each of the four encoder input vectors $V_0$, $V_1$, $V_2$ and $V_3$ to the encoder block 460 (e.g., vector $V_0$ includes $Sample_{0,0}$ through $Sample_{0,N-1}$).

Controller 456 controls the operation and timing of assembly bank 450, the staging bank 452, and the presentation bank 454. In particular, the controller is responsible for defining the permutation used and the number of samples N when building the four encoder input vectors $V_0$, $V_1$, $V_2$ and $V_3$. The controller 456 is also responsible for coordinating the clock domain crossing from the first clock frequency to the second clock frequency as performed by the staging bank 452. The controller 456 is further responsible for coordinating the timing of when the presentation bank 454 presents the N samples of each of the encoder input vectors $V_0$, $V_1$, $V_2$ and $V_3$ to the encoder block 460.

Within the encoder block 460, a plurality of digital-to-analog converters (DACs) 462 is provided, each arranged to receive one of the P*N samples ($Sample_{0,0}$ through $Sample_{P-1,N-1}$) assigned to the four encoder input vectors $V_0$, $V_1$, $V_2$ and $V_3$ collectively. Each DAC 462 converts its received sample from the digital domain into a differential pair of voltage signals having a magnitude that is proportional to its incoming digital value. The output of the DACs 462 may range from a maximum voltage to a minimum voltage.

Figure 14:
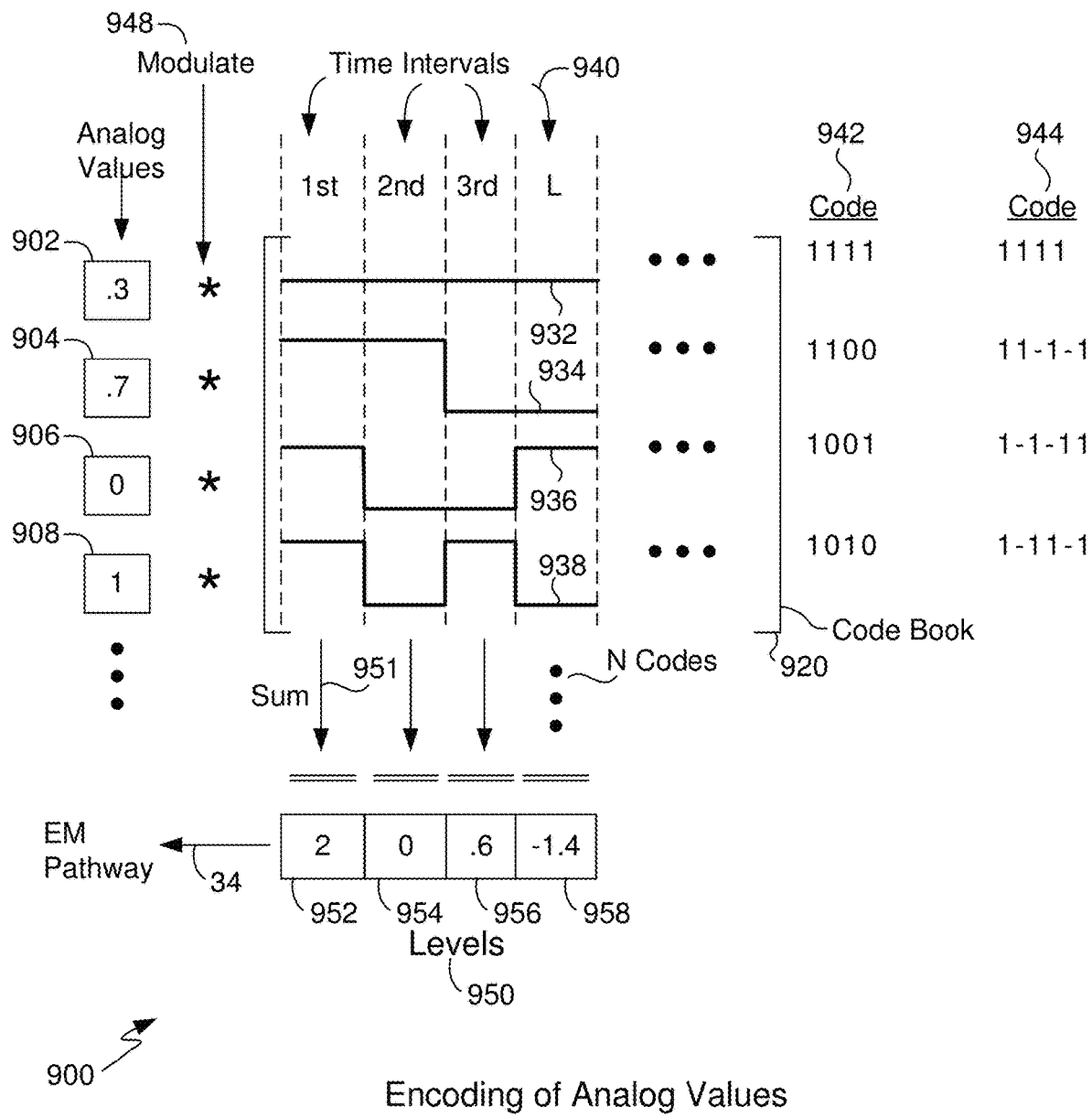
FIG. 14 illustrates a simplistic example showing how signal samples, in this case, analog values, are encoded within an encoder and then sent over an electromagnetic pathway.
Figure 15:
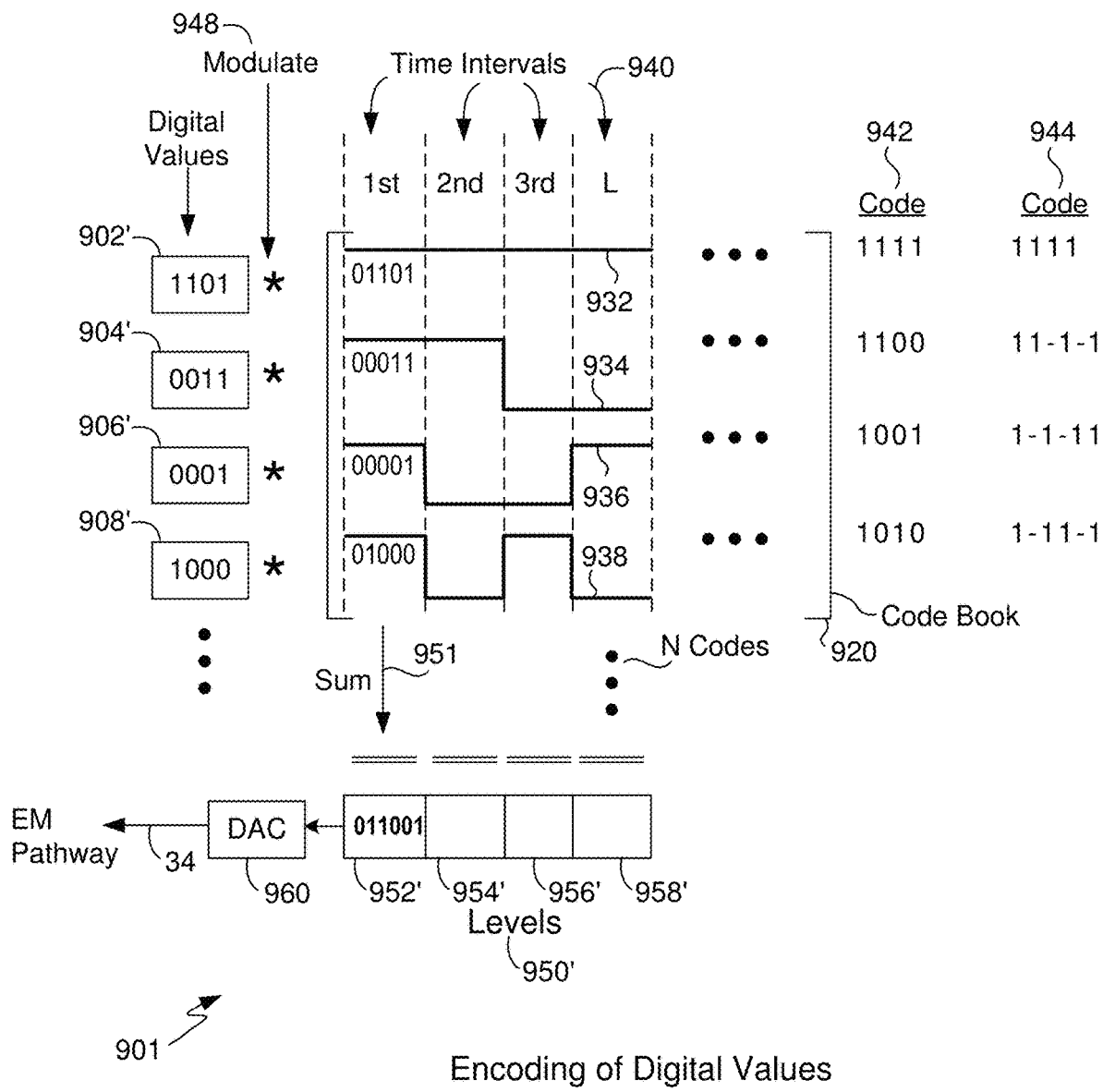
FIG. 15 illustrates this novel encoding technique as being applicable to signal samples that are digital values.

The four encoders 142 are provided for the four encoder input vectors $V_0$, $V_1$, $V_2$ and $V_3$ respectively. Each encoder 142 receives the differential pair of signals for each of the N samples for its encoder input vector, modulates each of the N differential pair of voltage signals using chips from a code corresponding to each sample, accumulates the modulated values and then generates L differential output levels as shown in FIGS. 14 and 15, these L levels producing one of the EM Signals. Since there are four encoders 142 in this example, there are EM $Signals_0$ through EM $Signals_3$ that are simultaneously output. Preferably, $L>=N>=2$. As described, the encoding may be analog (DACs placed before the encoders) or digital (in which the L levels are converted to analog by a DAC before being transmitted). The L analog output levels are then transmitted over its EM pathway as part of the SSVT signal to an SSVT receiver, which in this case is part of source driver 586. Advantageously, the SSVT signal is an analog signal and no DACs are required at the source drivers.

A sequencer circuit 465 coordinates the timing of the operation of the DACs 462 and the encoders 142. The sequencer circuit 465 is responsible for controlling the clocking of the DACs 462 and the encoders 142. The sequencer circuit 465 is also responsible for generating two clock phase signals, "clk 1" and "clk 2", that are responsible for controlling the operation of the encoders 142.

Transmission of SSVT Signal to Visor Display

Figure 6:
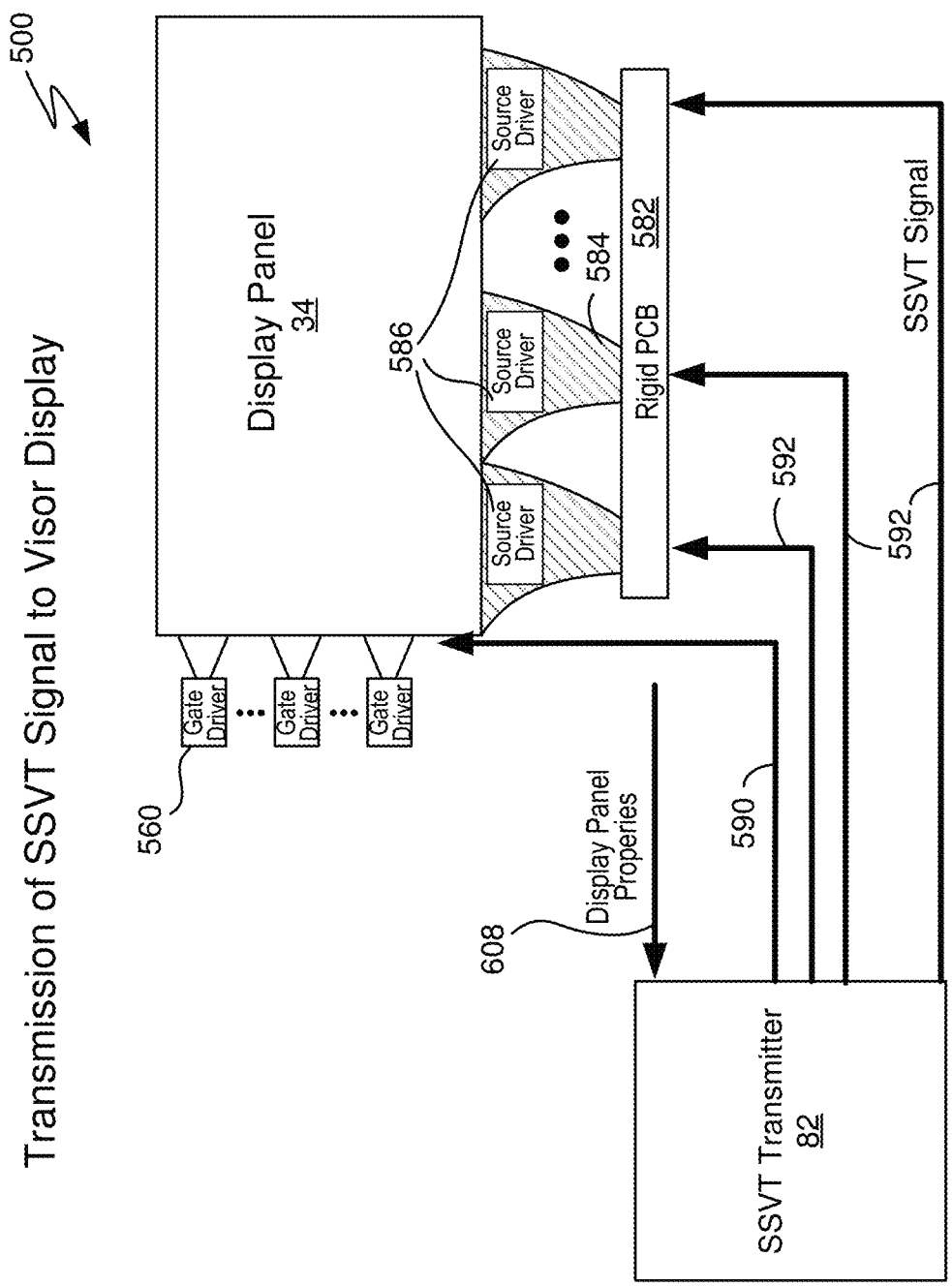
FIG. 6 illustrates delivery of an SSVT signal to a display panel of a VR visor.

FIG. 6 illustrates delivery of an SSVT signal to a display panel 34 of a VR visor 20. Not shown are the SoC and TCON of the headset processor 60. There may be three or more embodiments of integration: a discrete implementation in which the SSVT transmitter is embedded in a mixed-signal integrated circuit and the TCON and SoC are discrete components (the SSVT transmitter is inserted between a legacy TCON and the novel source drivers described herein and translates TCON output signals into SSVT signals); a mixed-implementation in which the SSVT transmitter is integrated with the TCON in a single IC and the SoC is discrete; and a fully-integrated implementation in which as many functions as possible are integrated in a custom mixed-signal integrated circuit (the SSVT transmitter is integrated with the TCON and the SoC).

In this example of FIG. 6, the display panel 34 may be of any size within a VR headset and may be a heads-up display (HUD) in which the display is projected onto a screen of a visor, etc. Not shown is left display 32 which receives its own SSVT signal for display. Typically, in multiple-display headsets, each panel will receive its own signal.

Also shown within FIG. 6 is SSVT transmitter 82 that generates SSVT signals 592 for the source drivers 586 as well as power and control signals 590 for the gate drivers 560. Included are a rigid PCB 582 as well as individual flexible PCBs 584 each holding a source driver 586 which generate source voltages for the display panel. As will be described in greater detail below, signals 608 optionally provide information concerning the display panel back to the transmitter 82 to assist with encoding of the SSVT signals. Generation of the gate driver control signals 590 may be performed by the timing controller (or by other specific hardware) based on synchronization information from the source drivers. Typically, most panels having more than about 1,024 columns are implemented with an array of source driver chips due to pin count constraints, one source driver per chip. For panels of fewer columns, it is contemplated that only a single source driver is needed.

Typically, an SSVT transmitter and an SSVT receiver are connected by a transmission medium. In various embodiments, the transmission medium can be a cable (such as HDMI, flat cable, fiber optic cable, metallic cable, non-metallic carbon-track flex cables), or can be wireless. There may be numerous EM pathways of the transmission medium, one pathway per encoder. The SSVT receiver will include multiple decoders, the same number as the encoders.

Display Panel Source Driver

Figure 7:
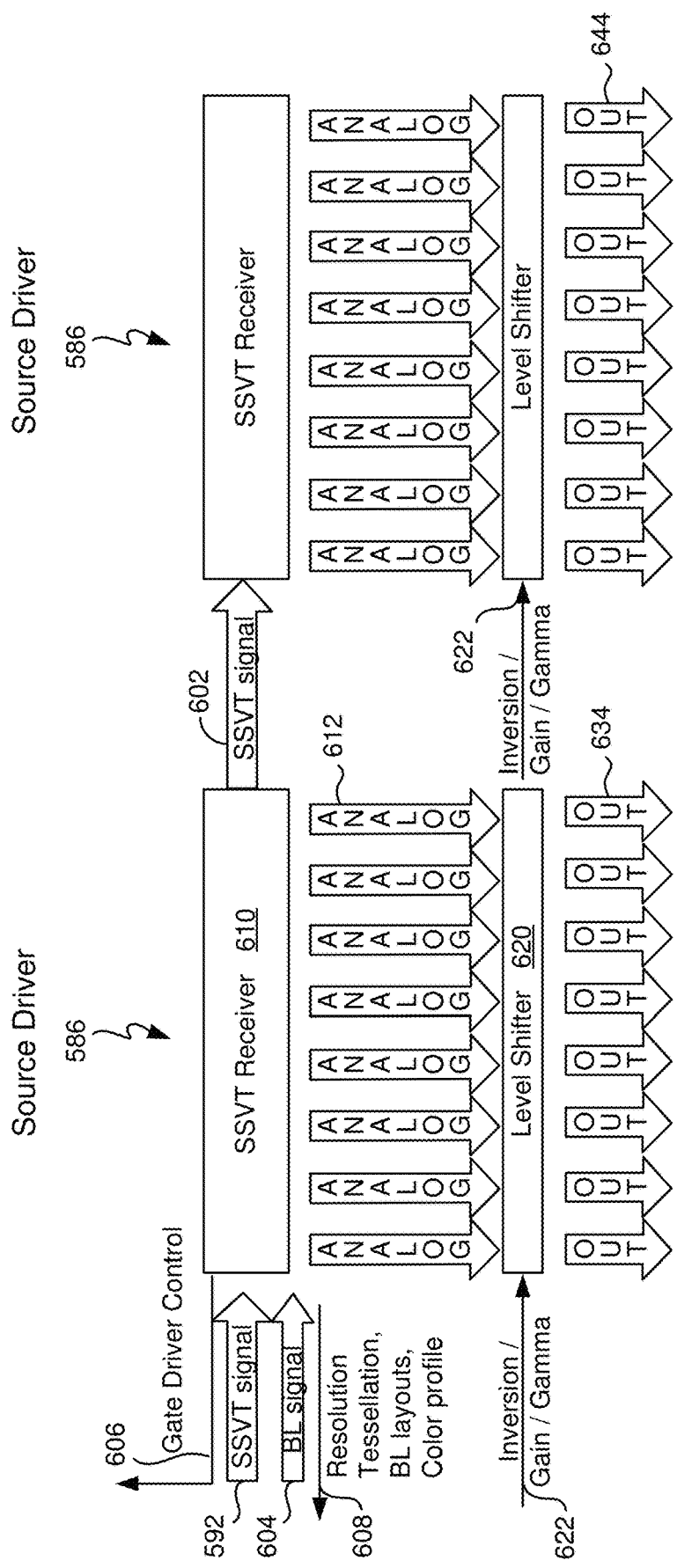
FIG. 7 illustrates display source drivers.

FIG. 7 illustrates display source drivers 586. Multiple source drivers are cascaded as shown and as known in the art; these multiple source drivers then drive the display panel. As shown, a source driver 586 does not require a DAC (in the signal path for converting digital samples into analog samples for display) as required in prior art source drivers. Input to an SSVT receiver 610 of each source driver is an analog SSVT signal 592 that has been encoded upstream as is described herein. As shown, SSVT signal 592 is daisy chained between source drivers. In an alternative embodiment, each source driver will have its own SSVT signal and the TCON provides timing information to each source driver chip.

SSVT receiver 610 may have any number (P) of decoders and having only a single decoder is also possible. Each receiver 610 decodes the SSVT signal (described in greater detail below) and outputs numerous reconstructed analog sample streams 612, i.e., analog voltages (the number of sample streams corresponding to the number of outputs of the source driver). Because these analog outputs 612 may not be in the voltage range required by the display panel they may require scaling, and may be input into a level shifter 620 which shifts the voltages into a voltage range for driving the display panel using an analog transformation. Any suitable level shifters may be used as known in the art, such as latch type or inverter type. Level shifters may also be referred to as amplifiers.

By way of example, the voltage range coming out of the SSVT receiver may be 0 to 1 V and the voltage range coming out of the level shifter may be −8 up to +8 V (using the inversion signal 622 to inform the level shifter to flip the voltage every other frame, i.e., the range will be −8 to 0 V for one frame and then 0 V to +8 V for the next frame). In this way, the SSVT signals do not need to have their voltages flipped every frame; the SSVT receiver provides a positive voltage range (for example) and the level shifter flips the voltage every other frame as expected by the display panel. The SSVT receiver may also implement line inversion and dot inversion. The inversion signal tells level shifter which voltages to switch. Some display panels such as OLED do not require this voltage flipping every other frame in which case the inversion signal is not needed and the level shifter would not flip voltages every other frame. Display panels such as LCD do require this voltage flipping. The inversion signal 622 is recovered from the SSVT receiver as will be explained below.

Also input into the level shifter 620 can be a gain and a gamma value; gain determines how much amplification is applied and the gamma curve relates the luminous flux to the perceived brightness which linearizes human's optical perception of the luminous flux. Typically, in prior art source drivers both gain and gamma are set values determined by the manufactured characteristics of a display panel. In the analog level shifter 620 gain and gamma may be implemented as follows. Gamma is implemented in the digital part of the system in one embodiment, and level shifting and gain are implemented in the driver by setting the output stage amplification. In the case of gamma, implementation is also possible in the output driver, by implementing a non-linear amplification characteristic. Once shifted, the samples are output 634 which are used to drive the source electrodes in their corresponding column of the display panel as is known in the art.

In order to properly encode an SSVT signal for eventual display on a particular display panel (whether encoded within the headset itself or farther upstream outside of the headset) various physical characteristics or properties of that display panel are needed by the GPU (or other display controller) or whichever entity performs the SSVT encoding. These physical characteristics are labeled as 608 and include, among others, resolution, tessellation, backlight layout, color profile, aspect ratio, and gamma curve. Resolution is a constant for a particular display panel; tessellation refers to the way of fracturing the plane of the panel into regions in a regular, predetermined way and is in units of pixels; backlight layout refers to the resolution and diffusing characteristic of the backlight panel; color profile is the precise luminance response of all primary colors, providing accurate colors for the image; and the aspect ratio of a display panel will have discrete, known values.

These physical characteristics of a particular display panel may be delivered to, hardwired into, or provided to a particular display controller in a variety of manners. In one example as shown in FIG. 6, signal 608 delivers values for these physical characteristics directly from the display panel (or from another location within a display unit) to the SSVT transmitter 82. Or, an SSVT transmitter 82 embedded within a particular display unit comes with these values hardcoded within the transmitter. Or, a particular display controller is meant for use with only particular types of display panels and its characteristic values are hardcoded into that display controller.

Input to the display panel can also be a backlight signal 604 that instructs the LEDs of the backlight, i.e., when to be switched on and at which level. In other words, it is typically a low-resolution representation of an image meaning that the backlight LEDs light up where the display needs to be bright and they are dimmed where the display needs to be dim. The backlight signal is a monochrome signal that can also be embedded within the SSVT signal, i.e., it can be another parallel and independent video signal traveling along with the other parallel video signals, R, G and B (for example), and may be low or high resolution.

Output from SSVT receiver 610 is a gate driver control signal 606 that shares timing control information with gate drivers 560 on the left edge of the display panel in order to synchronize the gate drivers with the source drivers. Typically, each SSVT receiver includes a timing acquisition circuit that obtains the same timing control information for the gate drivers and one or more of the source driver flex foils (typically leftmost and/or rightmost source driver) will conduct that timing control information to the gate drivers. The timing control information for the gate drivers is embedded within the SSVT signal and is recovered from that signal using established spread spectrum techniques.

Typically, a conventional display driver is connected directly to glass using "COF" (Chip-on-Flex or Chip-on-Foil) IC packages; conventional COG (chip-on-glass) is also possible. It is possible to replace these drivers by the novel source drivers described herein, thus turning an existing display panel into an SSVT-enabled panel. The inputs of these ICs are usually connected together by a PCBA, providing the input signals from a video source and timing controller. These can be close to or far away from the display panel, transferring the video and control signals across an inexpensive wire.

SSVT Decoding and Integration with Source Driver Detail

On the receive side, the decoders of each source driver are responsible for decoding the stream of the differential EM level signals received over the transmission medium back into a format suitable for display. Once in the suitable format, the video content contained in the samples can be presented on a video display, frame after frame. As a result, the video capture from any video source can be re-created by a video sink.

Figure 8:
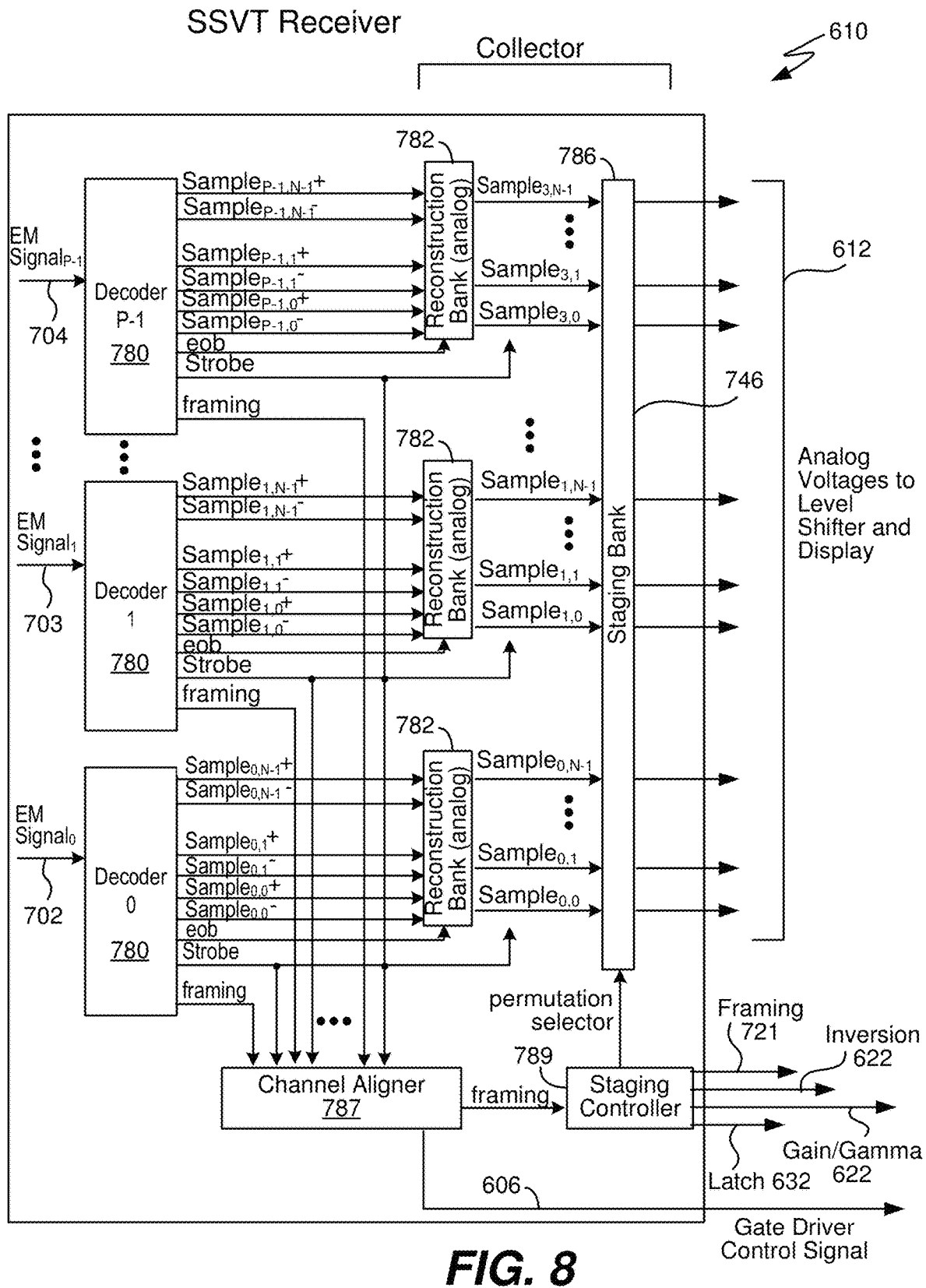
FIG. 8 illustrates a more detailed view of SSVT receiver of a source driver.

FIG. 8 illustrates a more detailed view of SSVT receiver 610 of a source driver. P represents the number of input electromagnetic pairs, each pair carrying an SSVT signal independent from the others, except that they are isochronous signals, known to have been generated in lockstep with one another by encoders on the transmit side. The source driver contains P decoders 780 and a collector (blocks 782, 786). A decoder 780 performs the inverse transform of its paired encoder on the transmit side and reconstructs its input differential EM level signals into an output vector of N reconstructed samples (although single-ended inputs rather than differential inputs may be used). The collector assigns the decoder output vector samples (or, "reconstructed samples") to their predetermined positions in the source driver inputs 612. The source driver inputs 612 include reconstructed samples corresponding to the driven group of columns in the display panel. The retimer function is included within the collector.

The P decoders 780 (labeled 0 through P−1) are arranged to receive differential EM Signals$_0$ through EM Signals$_{P-1}$ respectively, 702-704. In response, each of the decoders 780 generates N differential pairs of reconstructed samples (Sample$_0$ through Sample$_{N-1}$). In the case where there are four decoders 780 (P=4), four vectors $V_0$, $V_1$, $V_2$ and $V_3$ are constructed respectively. The number of samples, N, is equal to the number of orthogonal codes used for the earlier encoding i.e., there are N orthogonal codes used, meaning N codes from the code book.

Reconstruction banks 782 sample and hold each of the differential pairs of N reconstructed samples (Sample$_0$ through Sample$_{N-1}$) for each of the four decoder output vectors $V_0$, $V_1$, $V_2$ and $V_3$ at the end of each decoding interval respectively. These received differential pair of voltage signals are then output as samples (Sample$_{N-1}$ through Sample$_0$) for each of the four vectors $V_0$, $V_1$, $V_2$ and $V_3$ respectively. Essentially, each reconstruction bank reconstructs from a differential pair to a single voltage. The staging bank 786 receives all the reconstructed samples ($N_{n-1}$ through $N_0$) for each of the four decoder output vectors $V_0$, $V_1$, $V_2$ and $V_3$ and serves as an analog output buffer as will be described in greater detail below. Once the samples are moved into staging bank 786 they are triggered by a latch signal 632 derived from the decoded SSVT signal. The latch signal may be daisy-chained between source drivers. Once the samples are released from the staging bank they are sent to level shifter 620.

SSVT receiver 610 also includes a channel aligner 787 and a staging controller 789, which receives framing information and aperture information from each decoder 780. In response, the staging controller 789 coordinates the timing of the staging bank 786 to ensure that all the samples come from a common time interval in which the level signals were sent by the SSVT transmitter. As a result, the individual channels of the transmission medium do not necessarily have to all be the same length since the channel aligner 787 and staging controller 789 compensate for any timing differences. The gate driver control signal 606 provides the timing information to the gate drivers (or to intermediate circuitry) which in turn provides the correct timing and control signals to the gate drivers, and may originate from channel aligner 787.

Note that FIG. 8 discloses a decoder that buffers the samples in staging bank 786 and then shifts levels (amplifies); it is also possible to shift levels and then buffer the samples for output.

Display Panel Source Driver Array

Figure 9:
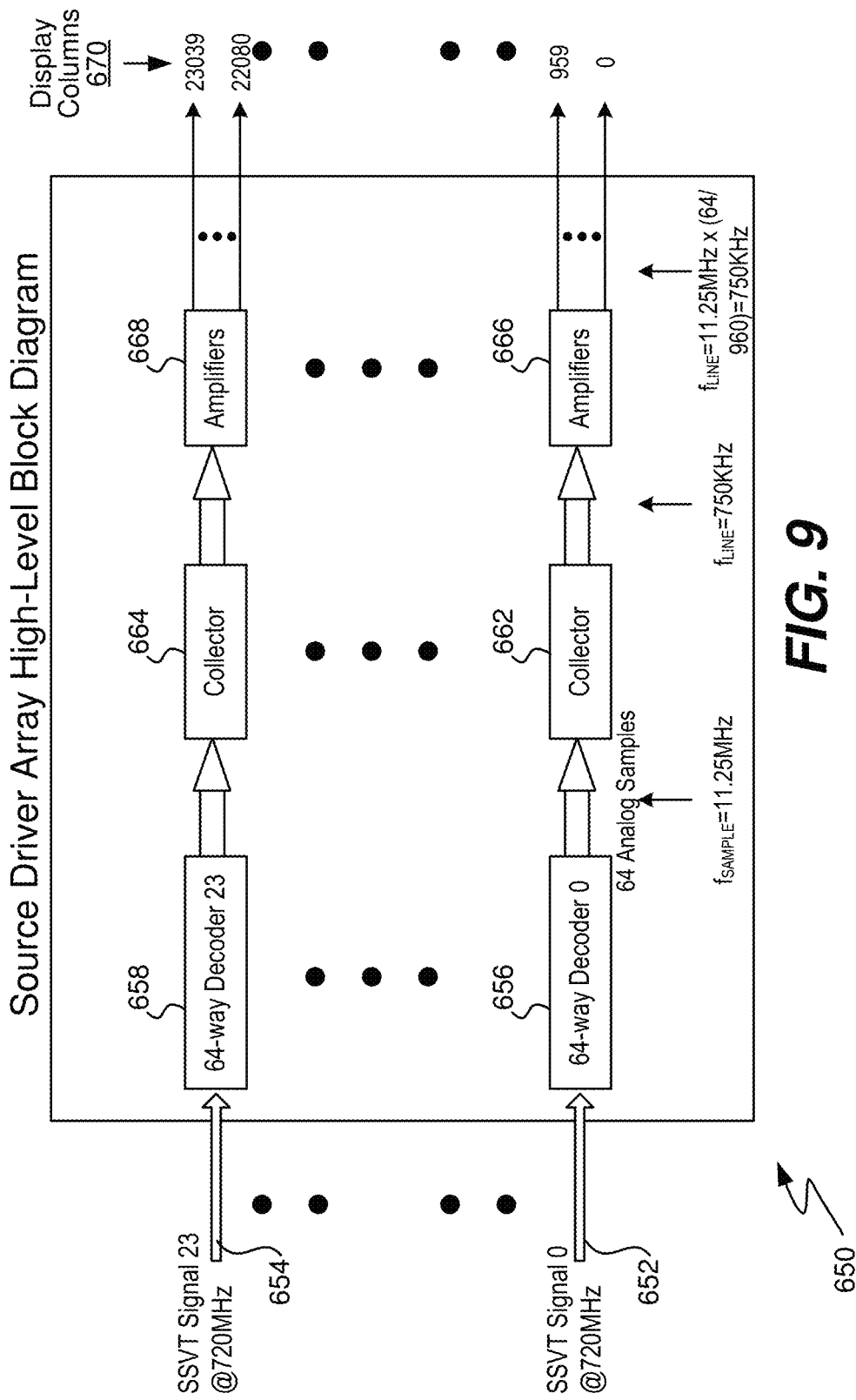
FIG. 9 illustrates an alternative embodiment for implementing an array of source drivers.

FIG. 9 illustrates an alternative embodiment for implementing an array of source drivers. In this embodiment each source driver includes a single decoder (i.e., an SSVT receiver of one decoder) followed by a collector and amplifiers whereas FIGS. 7 and 8 show that each source driver may have many decoders within the SSVT receiver of the source driver. Either approach may be used. [This array works well for a high-resolution (8K) display panel. As the resolution of VR display panels range from 960×1080 up to 3840×2160 currently, one of skill in the art will be able to adapt the number of source drivers used (and the number of outputs per source driver) in order to accommodate a typical VR display panel.

Shown are 24 720 MHz SSVT signals 652-654, each being a twisted-wire pair from an SSVT transmitter 540, that is, each twisted wire pair originating at an encoder of the transmitter. Each pair is input into one of decoders 656-658, each decoder outputting 64 analog samples at a frequency of 11.25 MHz. These samples are each input into one of 24 collectors 662-664, each collector collecting 15 sets of these samples before updating its output once every 15 decoding intervals as is shown in greater detail below. As mentioned above, each collector consists of a reconstruction bank plus a staging bank (not shown explicitly in this drawing). In turn, these 960 analog samples from each collector are then input at a frequency of 750 kHz into one of amplifiers 666-668 for amplification before being output at a frequency of 750 kHz (11.25 MHz×64/960) as amplified analog levels 670 onto the display columns of the display panel. In the interests of clarity, not shown are signals 604, 606, 608, 622, 632 which are shown in FIGS. 7 and 8.

The amplifiers or level shifters may be left out if the encoded SSVT signals are higher voltages and the decoded signals result in sample voltages that are required by a display. But, as the SSVT signal will typically be low voltage (and a higher voltage output is required for a large format display), amplification is often necessary. In the case of displays within a VR headset, though, the amplifiers may not be necessary and are optional.

Note that FIG. 9 discloses a decoder that buffers the samples in collector 664 and then amplifies; it is also possible to amplify and then collect (buffer) the samples for output. Either embodiment may be used.

Figure 10:
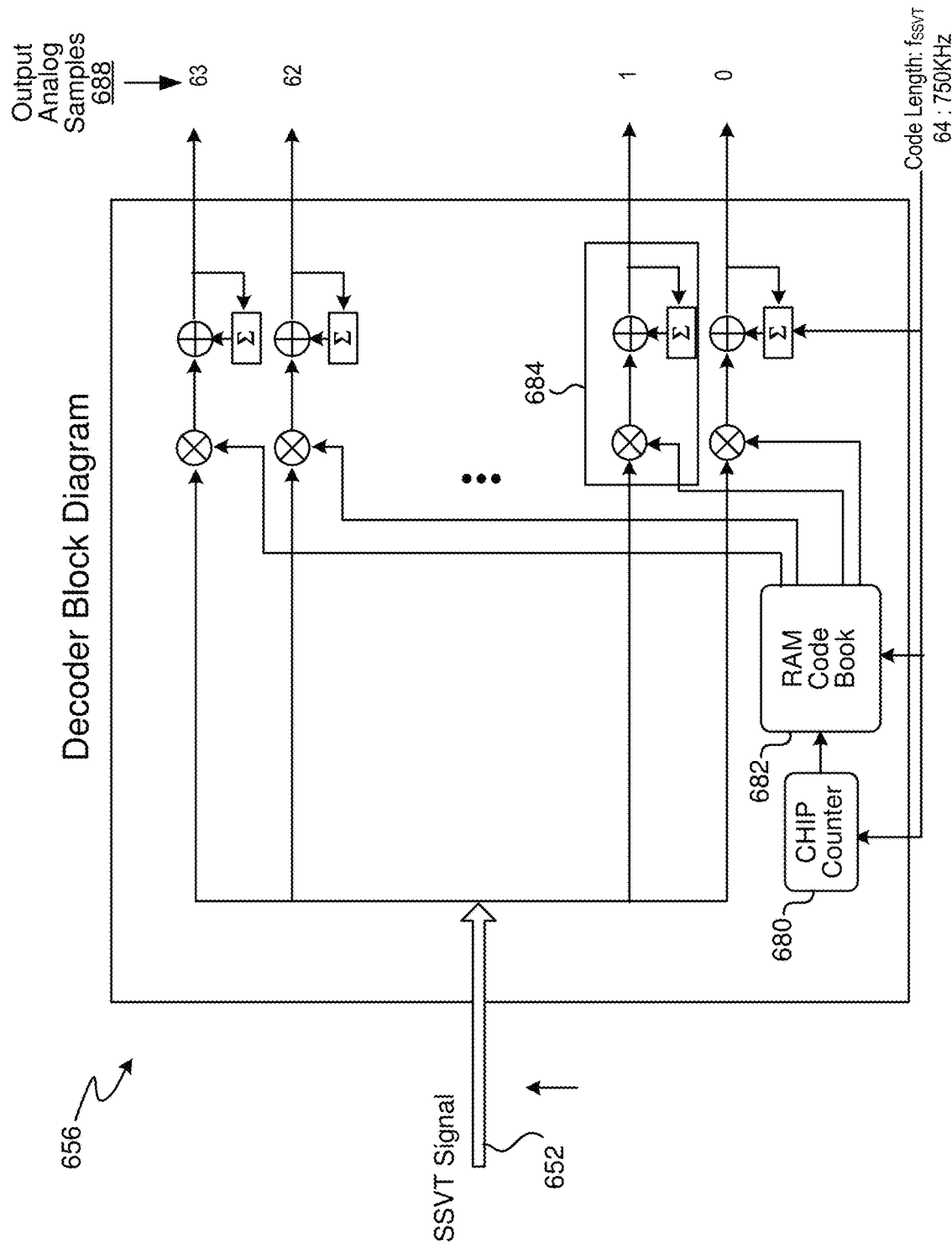
FIG. 10 is a block diagram of one of the decoders from FIG. 9.

FIG. 10 is a block diagram of one of the decoders 656 from FIG. 9. Shown is one of the SSVT signals 652 being input to the decoder. The decoder includes a chip counter 680, a codebook 682 typically stored in RAM that contains the orthogonal codes used for encoding and decoding, as well as a block diagram 684 for each decoding circuit for each of the 64 output analog samples 688. Each group of 64 analog samples are output "valid" every 1 out of L cycles at 11.25 MHz. Decoding is explained in greater detail below.

Figure 11:
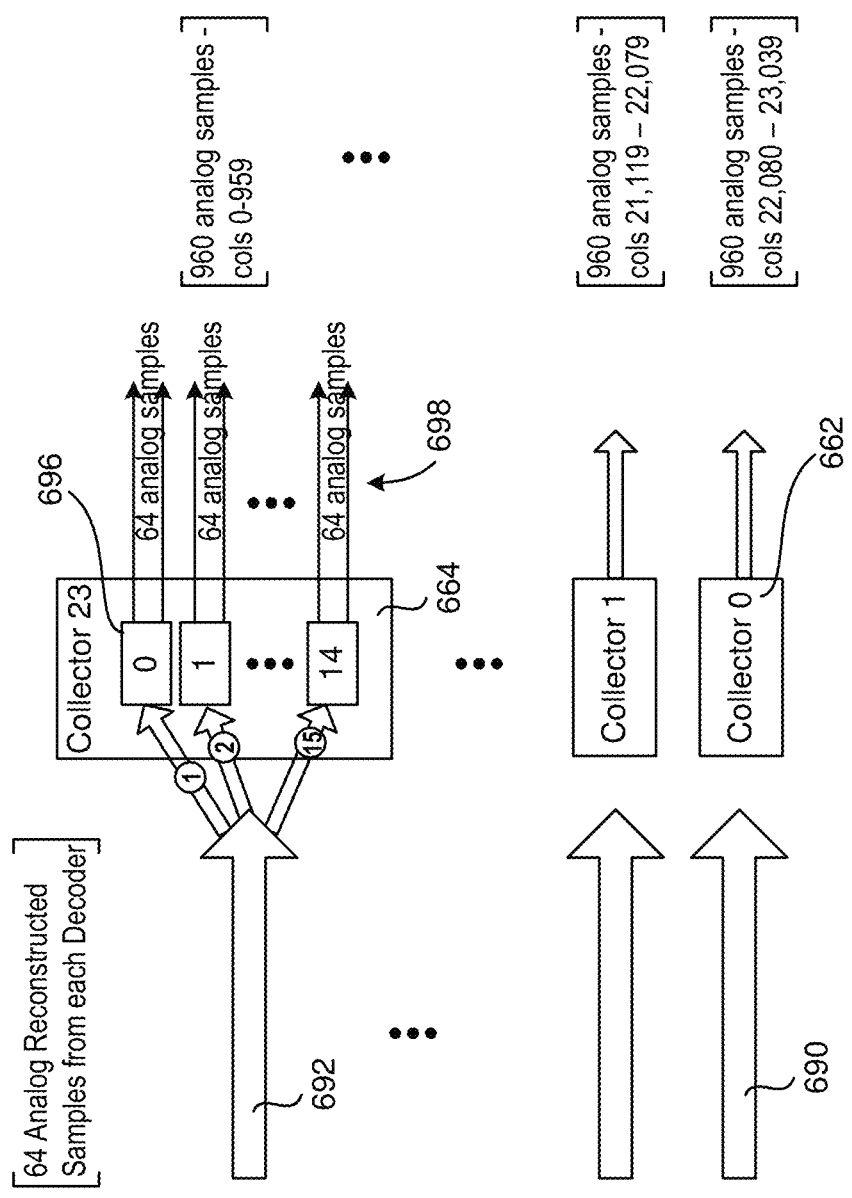
FIG. 11 is a block diagram of the collectors from FIG. 9, and show more detail of the staging bank from FIG. 8.

FIG. 11 is a block diagram of the collectors from FIG. 9, and show more detail of the staging bank 786 from FIG. 8. Basically, an individual collector performs serial-to-parallel conversion into a partitioned line buffer. Shown input into each of collectors 662-664 is a set of 64 analog samples 690-692 from each decoder at a frequency of 11.25 MHz (not shown is the reconstruction bank 782). As shown, during each decoding interval, a new set of incoming 64 reconstructed samples is stored within a collector, each collector being filled once every 15 decoding intervals. After each 15 decoding intervals, the 960 stored samples 698 from each collector are output into their corresponding amplifiers 666-668 before being delivered to the corresponding columns of the display panel as shown.

In one particular embodiment, each of the source drivers of FIG. 9 (e.g., decoder 658, collector 664 and amplifiers 668) are implemented within an integrated circuit and each such integrated circuit may be mounted upon a flexible PCB 584 as shown in FIG. 6.

Wireless Transmission of SSVT Encoded Signals

As previously noted, one of the possible options for the transmission medium of the P EM signals from an SSVT transmitter 82 is wireless. As described in detail below, a wireless embodiment for transmitting and receiving SSVT encoded electromagnetic signals is provided.

Figure 12:
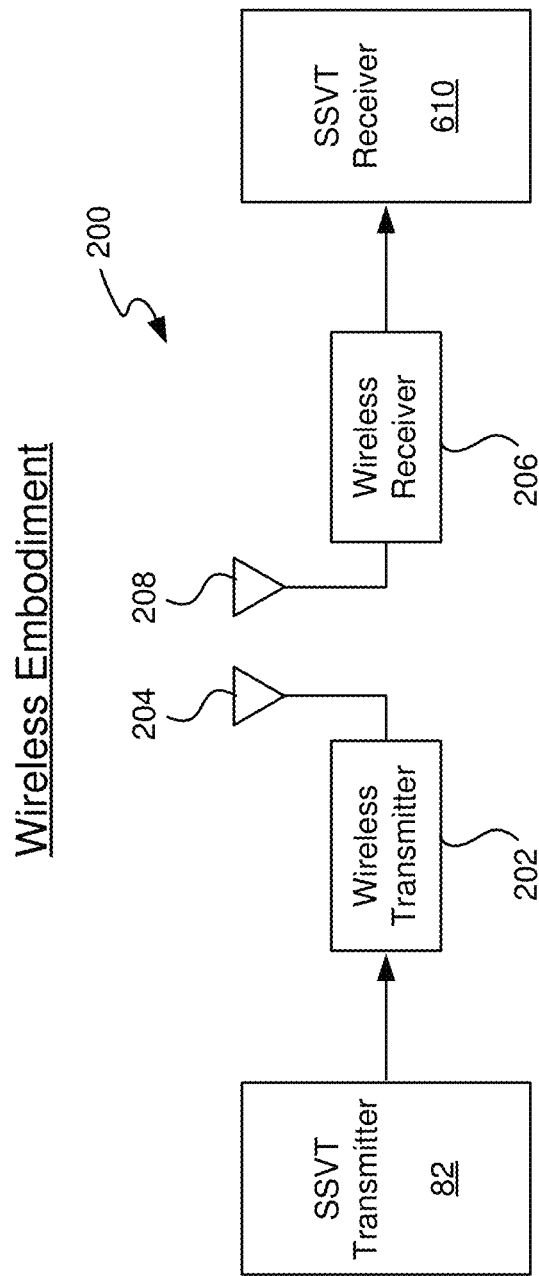
FIG. 12 is a block diagram for a wireless implementation of the transmission medium is illustrated.

Referring to FIG. 12, a block diagram 200 for a wireless implementation of the transmission medium is illustrated (since the medium is wireless in this embodiment, it is not shown). With this embodiment, a wireless transmitter 202 and antenna 204 are provided on the transmit side, and a receiver 206 and an antenna 208 are provided on the receive side. The transmitter 202 modulates the SSVT electromagnetic signals generated by the SSVT transmitter 82 onto one or more carrier frequency signals. Once modulated, the carrier frequency signals are then broadcast by the antenna 204. On the receive side, the antenna 208 receives the broadcast and provides the modulated carrier signals to the wireless receiver 206. In response, the receiver 206 demodulates and produces the SSVT electromagnetic signals, which are then provided to the SSVT receiver 610. Instead of being provided to an SSVT receiver 610 (which is integrated with a source driver of a display), the SSVT electromagnetic signals may also be provided to any of the SSVT receivers described in application Ser. No. 17/686,790 (HYFYP004AX1) or Ser. No. 17/887,849 (HYFYP006). Once decoded, the video signals are available to drive a video display as previously described.

Figure 13A:
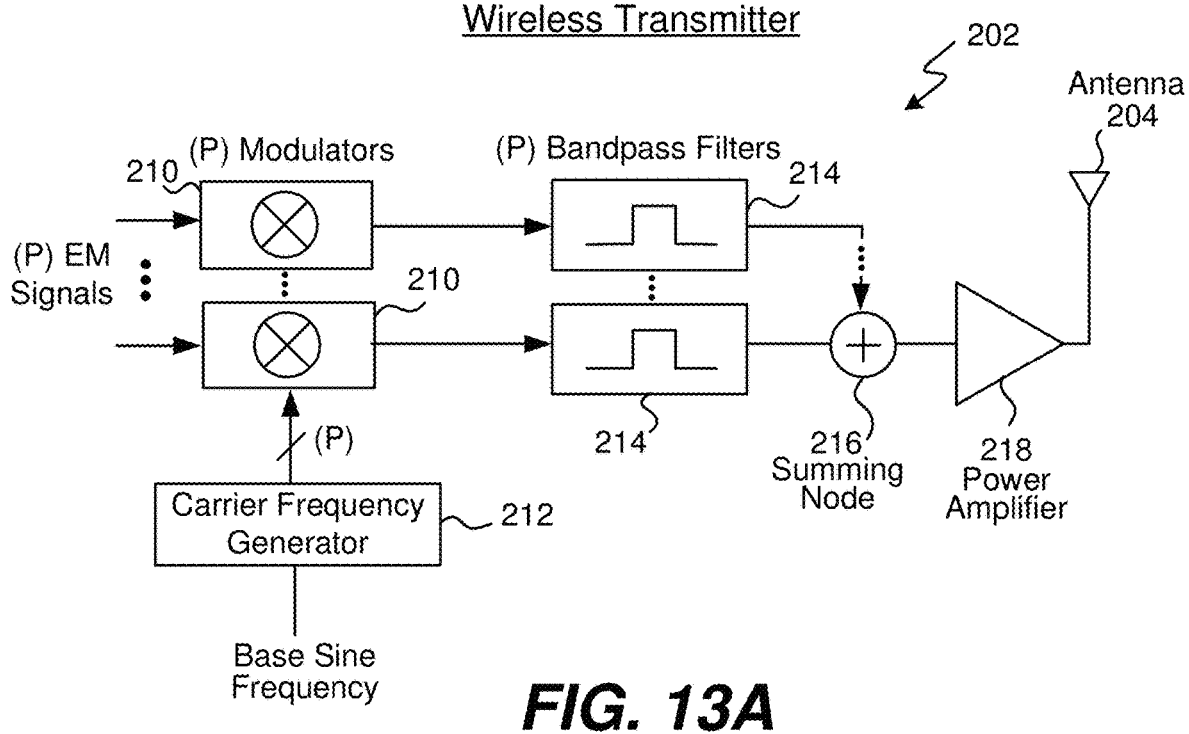
FIG. 13A, a diagram of the transmitter is illustrated.

Referring to FIG. 13A, a diagram of the transmitter 202 is illustrated. The transmitter 202 includes the antenna 204, one or more (P) modulators 210, a carrier frequency generator 212, one or more (P) bandpass filters 214, a summing node 216, and a power amplifier 218. The quantity of encoders 142 in the SSVT transmitter 82, and hence the quantity of EM signals output, is represented by (P). In the case where only once encoder 142 is used in the SSVT transmitter (i.e., P=1), then summing node 216 is not needed.

During operation, one or more electromagnetic (EM) signals (P), generated by the SSVT transmitter 82, are provided to the one or more modulators 210. In response, the modulators 210 each modulate one of the electromagnetic signals onto (P) different carrier frequency signals respectively. Preferably, the (P) carrier signals are different frequencies, but are all derived from the same base sine frequency. By performing the modulations, the (P) electromagnetic signals are essentially each superimposed onto the (P) carrier frequency signals respectively. The bandpass filters 214 then filter each of the modulated carrier frequency signals respectively. The bandpass filter outputs are next summed together at the summing node 216, which effectively sums all of the P voltage waveforms to produce a composite signal. The amplifier 218 amplifies the composite signal for the antenna 204. In response, the antenna 204 wirelessly broadcasts the composite signal (i.e., the amplified, summed, filtered and modulated carrier frequency signals). Preferably, both the amplifier and antenna are selected to be able to handle the additional bandwidth created by the composite signal.

The above modulation and broadcasting operations are continually performed so long as the SSVT transmitter 82 is generating (P) electromagnetic signals from a stream of video samples. As a result, an encoded wireless signal representing the stream of video samples is continually broadcast.

Figure 13B:
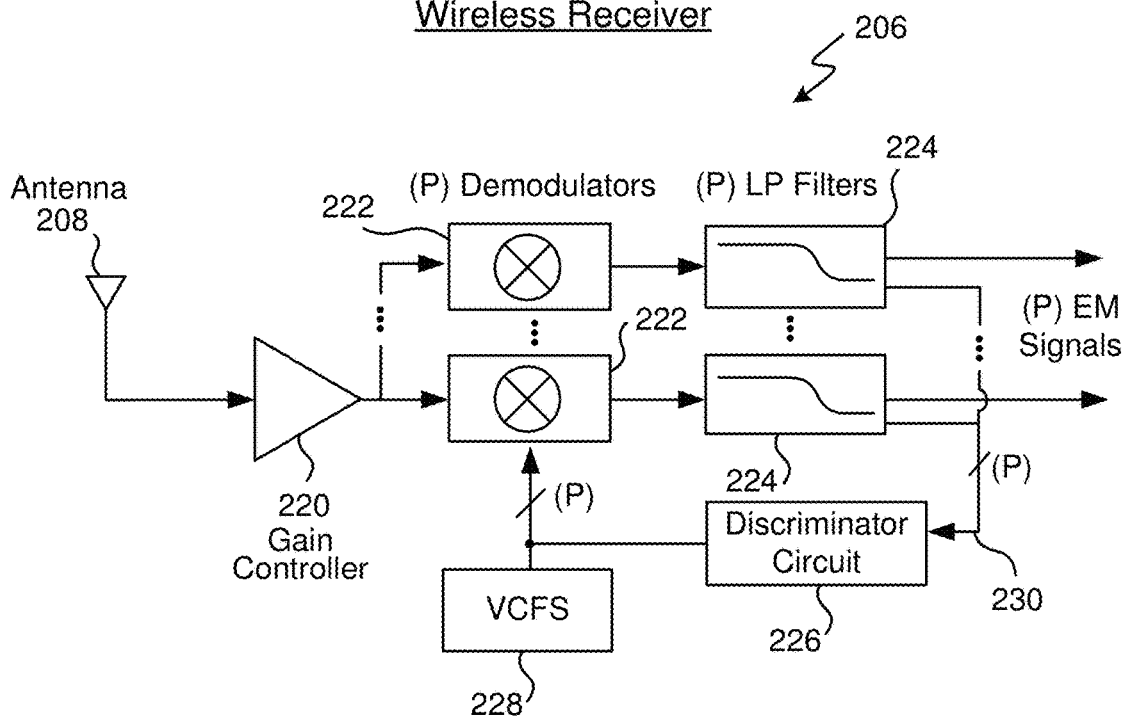
FIG. 13B is a diagram of the receiver is illustrated.

Referring to FIG. 13B, a diagram of the receiver 206 is illustrated. The receiver 206 includes the antenna 208, a gain controller 220, one or more (P) demodulators 222, one or more (P) lowpass filters 224, a discriminator circuit 226, and a Voltage Controlled Frequency Source (VCFS) 228.

During operation, the composite signal broadcast by the transmitter 202 is received by the antenna 208. The gain controller 220 adjusts the gain of the received composite signal signals; the gain controller may be implemented using either an Automated Gain Controller (AGC) or a Programmable Gain Amplifier (PGA). Either way, the gain-adjusted composite signal is provided to each of the demodulators 222.

In response, each demodulator 222 demodulates and produces one of the (P) electromagnetic signals from the composite signal. In one embodiment, each of the demodulators 222 is a super heterodyne receiver, which uses frequency mixing to convert the received signal to an Intermediate Frequency (IF) that can be more readily processed than the original incoming composite signal. Alternatively, each of the demodulators 222 is a Direct Conversion Receiver (DCR), which is a radio receiver designed to demodulate the incoming composite signal using synchronous detection driven by a local oscillator whose frequency is the same or very close to the carrier frequencies of the incoming composite signal. Regardless of the type of demodulator used, each of the (P) demodulated signals is provided to one of the low pass filters 224 respectively. Each lowpass filter filters its received demodulated electromagnetic signal and provides its output to the SSVT receiver 610 as previously described.

The discriminator circuit 226 provides a feedback loop between an output 230 of each of the demodulators 222 and the VCFS 228. In the event one or more of the frequencies used by a demodulator 222 for demodulation drifts, the discriminator circuit 226 acts to adjust the demodulation frequency (or frequencies) so that it locks onto and is the same as the received carrier frequency.

Above is described a wireless embodiment in which any number of electromagnetic signals are modulated, filtered and then summed in order to be amplified by and amplifier and output by an antenna, resulting in lower cost as only a single amplifier and single antenna are needed. In an alternative embodiment of the wireless transmitter 202, there is no summing node 216, and each of the (P) electromagnetic signals from the SSVT transmitter 82 are modulated and filtered as described, and then amplified and output using a power amplifier and an antenna per signal. In other words, instead of a single power amplifier and antenna, there will be (P) amplifiers and antennas. Similarly, the wireless receiver 206 may be implemented using (P) antennas, (P) gain controllers, and a demodulator and filter per signal as is described.

SSVT Signal, Encoding and Decoding

As mentioned earlier, various embodiments of the present invention disclose that an analog SSVT signal be used to transport video information within a VR headset or to and from the headset. Described below are techniques for encoding and decoding of that signal.

For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals. The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

FIG. 14 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent the luminance of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the starting signal sample voltages are usually higher than the encoded voltages in an SSVT signal. After encoding, the range of voltages is typically from 0 to 1 V for efficiency, although a different range is possible. Lower voltages mean less power consumed and may be used in the future.

These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

FIG. 15 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 16:
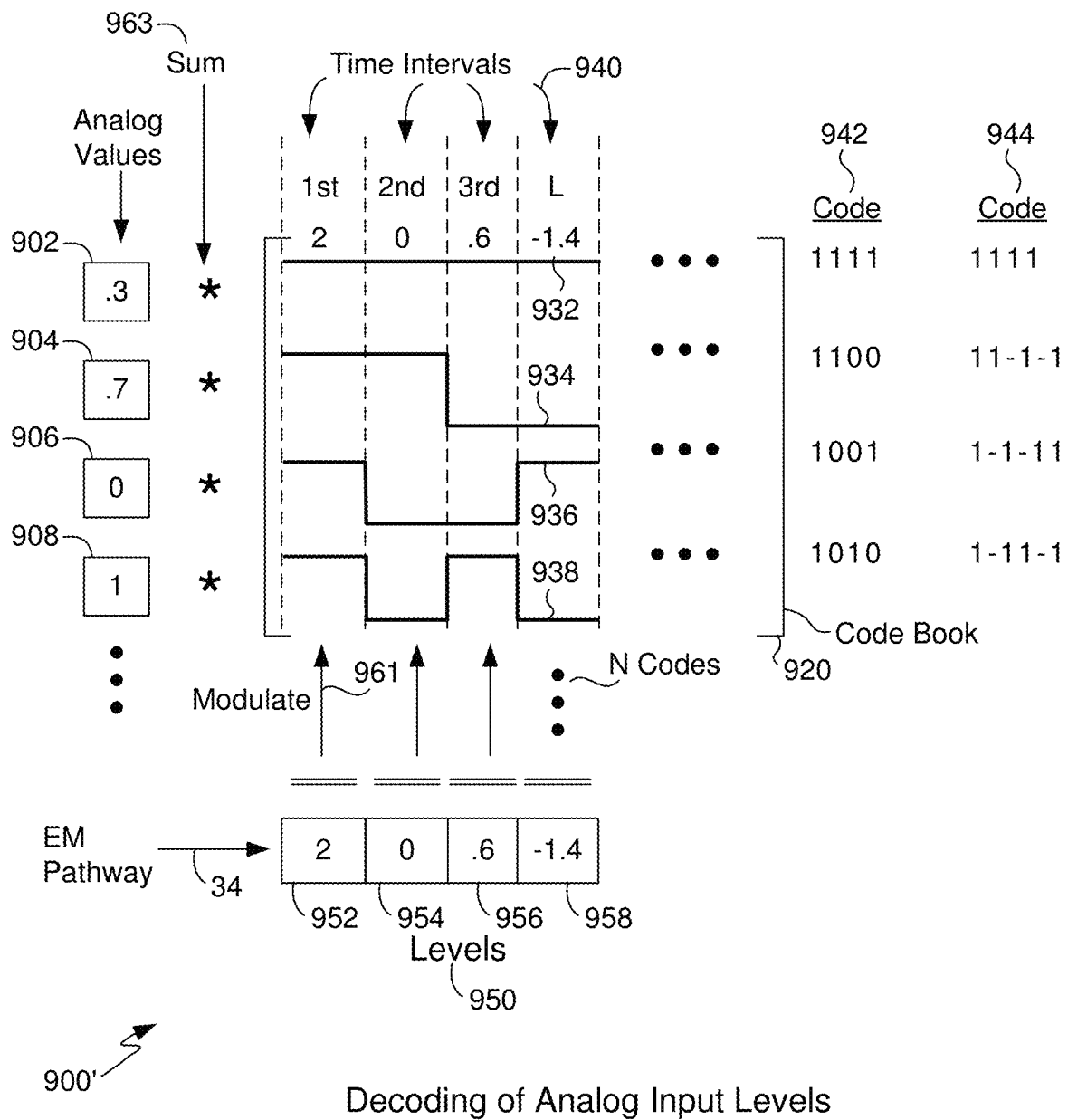
FIG. 16 illustrates the decoding of analog input levels that were encoded using the encoder of FIG. 14.

FIG. 16 illustrates the decoding of analog input levels that were encoded using the encoder of FIG. 14. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, −1.4". Modulation of levels 952-958 by the second code 934 produces the series of modulated values "2, 0, −0.6, 1.4". Modulation by the third code 936 produces "2, 0, −0.6, −1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 17A:
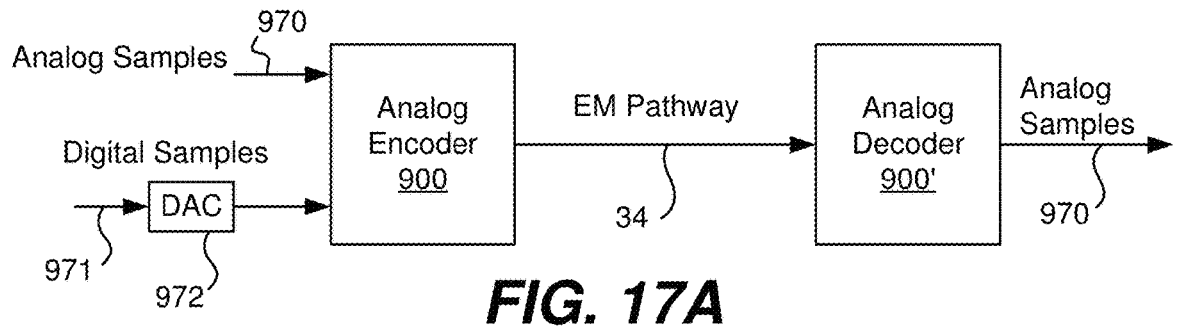
FIG. 17A illustrates use of an analog encoder and a corresponding analog decoder.
Figure 17B:
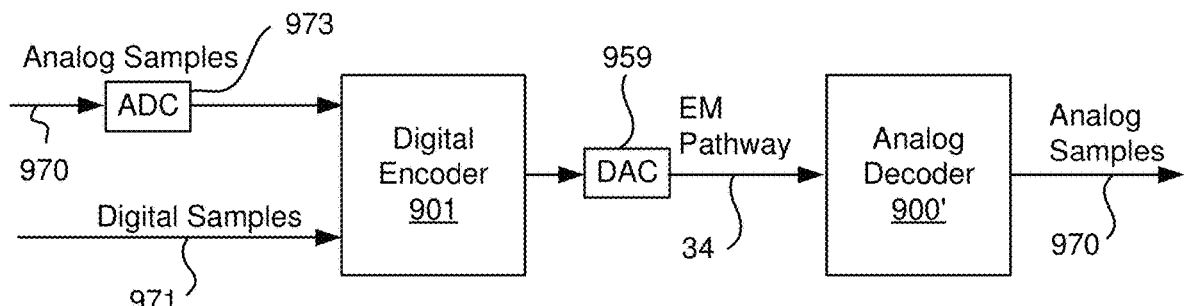
FIG. 17B illustrates use of a digital encoder and a corresponding analog decoder.
Figure 17C:
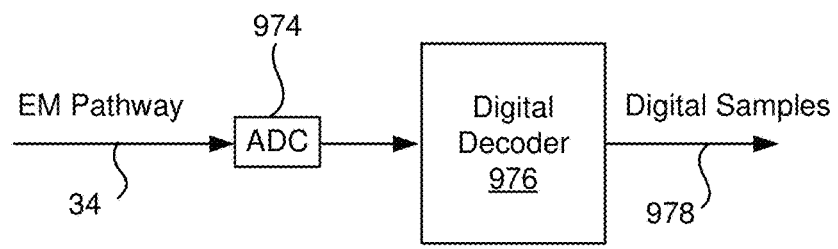
FIG. 17C illustrates use of a digital decoder to decode encoded analog signals that have arrived over an electromagnetic pathway on transmission medium.

FIGS. 17A, 17B and 17C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 17A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 17B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 17C illustrates use of a digital decoder to decode encoded analog signals that have arrived over an electromagnetic pathway on transmission medium 34. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Figure 18:
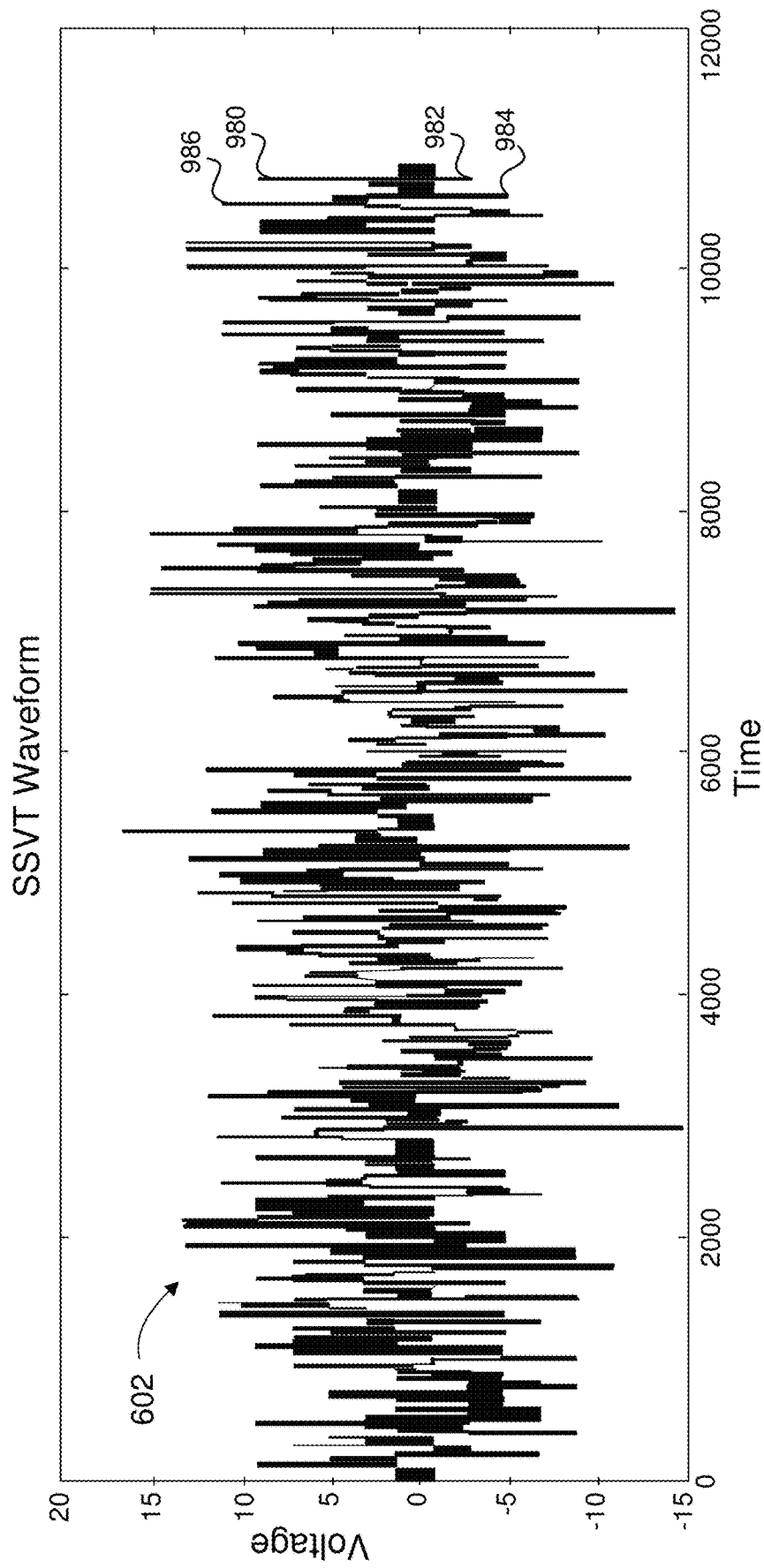
FIG. 18 shows a simulation (similar to an idealized oscilloscope trace) of an SSVT waveform sent via an electromagnetic pathway after being output from an analog encoder (or after being digitally encoded and then converted by a DAC).

FIG. 18 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art.

SSVT Encoded Chemical and Haptic Samples

Although the above description describes video samples that are encoded and transported via SSVT in order to display images upon a panel of a VR visor, reference is also made herein to chemical samples or haptic samples that may also be encoded and delivered via SSVT. In other words, any sample value arriving at an SSVT transmitter 82 or at an SSVT transmitter producing an SSVT signal received at the headset processor 60 (e.g., arriving via access points 72 or 74, via paths 808, 828, 848, etc.) may represent a chemical (such as smell) or haptic sensation (such as touch). By way of example, analog sample value 902 of FIG. 14 has been described as being a video sample, representing light, but this particular sample value may represent a certain chemical or a haptic sensation. By convention, it may be predetermined between an SSVT transmitter and an SSVT receiver (or between a video source and a destination processor) that certain sample positions within a frame of video (e.g., the last dozen positions of the first line of the frame) will hold chemical or haptic sample values instead of video sample values.

For instance, sample values representing the chemicals associated with the smell of a particular tree (e.g., value "0.1" means eucalyptus tree, value "0.2" means Jeffrey pine, etc.) may be embedded within the frame or frames in which the image of that tree appears in a video stream presented to the user on the display of the VR visor. When the user wearing the VR visor then turns to look at that tree, approaches the tree, attempts to touch the tree, etc., then the headset processor or VR visor may make use of those chemical sample values sent via SSVT to synthesize the odor of that particular tree at that time. An olfactometer associated with the VR headset then presents the synthesized odor to the user via a mask using controllable flow valves. One example of such a mask to deliver synthesized odors is described in "The Smell Engine: a System for Artificial Odor Synthesis in Virtual Environments," published by IEEE in the 2022 IEEE Conference on Virtual Reality and 3D User Interfaces (VR). Other odors may include: fresh water, contaminated water, smoke, multiple odors, etc. Advantageously, identification of specific odors is embedded along with the SSVT-encoded images of the object that produces those odors for easy synthesis of a particular odor in conjunction with the object that the user is viewing on a VR visor.

Further, sample values representing the haptic sensation (e.g., touch) associated with a particular tree (e.g., value "0.6" means smooth eucalyptus bark, value "0.7" means rough Jeffrey pine bark, etc.) may be embedded within the frame or frames in which the image of that tree appears in a video stream presented to the user on the display of the VR visor. When the user wearing the VR visor then attempts to touch the tree the headset processor or VR visor may make use of those haptic sample values to reproduce that sensation on the surface that the user is actually touching (e.g., a haptic pad, joystick, handheld controller, etc.) or on the surface in close proximity to the user's hand. Other examples of haptic sensations that may be transmitted via particular sample values that are encoded via SSVT include: heat, cold, wind, humid, dry, etc. Advantageously, identification of specific haptic sensations is embedded along with the SSVT-encoded images of the object that produces those sensations for easy synthesis of a particular sensation in conjunction with the object that the user is viewing or touching on a VR visor.

We claim:

1. A virtual reality (VR) headset comprising:
a headset processor including a transmitter arranged to receive a stream of video samples, to continuously encode sets of N of said video samples each into a set of L output levels, and to transmit said sets of L output levels as an analog waveform over an electromagnetic pathway, wherein $L \geq N \geq 2$; and a VR visor including at least one display having at least one source driver, said source driver including
- a receiver arranged to receive said sets of L output levels of said analog waveform from said transmitter,
- a decoder arranged to decode each set of said L output levels into an output vector of N analog samples,
- a buffer arranged to collect said output vectors of N analog samples each from said decoder, and to output said output vectors of N analog samples in parallel, each of said analog samples being output to a column of said display, wherein said analog samples corresponding to said stream of video samples are substantially displayed on said display.

2. The virtual reality headset as recited in claim 1 wherein said encoding of each set of N video samples into a set of L output levels is performed with reference to a predetermined code set of N mutually-orthogonal codes each of length L, each of said codes used to encode one of said N video samples, and wherein said decoding is performed with reference to said predetermined code set of N mutually-orthogonal codes.

3. The virtual reality headset as recited in claim 1 wherein said source driver further includes
- a plurality of amplifiers arranged to amplify said analog samples of said output vectors output from said buffer before being output to said display.

4. The virtual reality headset as recited in claim 1 wherein said source driver further includes
- a plurality of amplifiers arranged to amplify said analog samples of said output vectors output from said decoder before being input into said buffer.

5. The virtual reality headset as recited in claim 1 wherein said source driver does not include a digital-to-analog converter (DAC) for purposes of converting digital pixel data to analog pixel data.

6. The virtual reality headset as recited in claim 1, wherein said analog waveform is a spread spectrum video transport (SSVT) signal, wherein said display includes C columns per decoder, wherein said sets of L output levels are received serially at a frequency freq(SSVT), wherein each of said output vectors of N analog samples are output from said decoder at a frequency freq(sample)=freq(SSVT)/N, and wherein said buffer outputs said output vectors of N analog samples in parallel at a frequency freq(line)=freq(sample)×N/C.

7. The virtual reality headset as recited in claim 1 wherein said sets of L output levels are received serially at said receiver, and wherein said each output vector of N analog samples is output in parallel from said decoder.

8. The virtual reality headset as recited in claim 1 wherein said transmitter also transmits said sets of L output levels as a second analog waveform over a second electromagnetic pathway, and wherein said visor further including a second display having a second source driver that receives said sets of L output levels from said second analog waveform.

9. The virtual reality headset as recited in claim 1 wherein said headset processor further includes a wireless transmitter arranged to transmit said analog waveform over a RF electromagnetic pathway, and wherein said VR visor further includes a wireless receiver arranged to receive said analog waveform.

10. The virtual reality headset as recited in claim 1 wherein one of said video samples has a value that represents a chemical odor or a haptic sensation, said VR visor further including a device to reproduce said chemical odor or said haptic sensation for a user based upon the value of one of said N analog samples corresponding to said one of said video samples.

11. A virtual reality (VR) headset comprising:
- a headset processor including a wireless receiver arranged to receive an RF (radio-frequency) analog waveform including sets of L output levels representing a video stream, each set of L output levels being the encoded form of N video samples, wherein $L \geq N \geq 2$;
- an electromagnetic pathway over which said sets of L output levels are transmitted from said headset processor as an analog waveform; and
- a VR visor including at least one display having at least one source driver, said source driver including
  - a receiver arranged to receive said sets of L output levels of said analog waveform from said headset processor,
  - a decoder arranged to decode each set of said L output levels into an output vector of N analog samples,
  - a buffer arranged to collect said output vectors of N analog samples each from said decoder, and to output said output vectors of N analog samples in parallel, each of said analog samples being output to a column of said display, wherein said analog samples corresponding to said video stream is substantially displayed on said display.

12. The virtual reality headset as recited in claim 11 wherein said electromagnetic pathway is a wired pathway.

13. The virtual reality headset as recited in claim 11 wherein said electromagnetic pathway is a wireless pathway, said headset processor further including a wireless transmitter arranged to transmit said sets of L output levels to said receiver, and wherein said virtual reality headset further including a wireless receiver arranged to receive said sets of L output levels and to input said sets of L output levels into said receiver.

14. The virtual reality headset as recited in claim 11 wherein said decoding of each set of said L output levels is performed with reference to a predetermined code set of N mutually-orthogonal codes each of length L, each of said codes used to decode one of said N video samples.

15. The virtual reality headset as recited in claim 11 wherein said source driver further includes
- a plurality of amplifiers arranged to amplify said analog samples of said output vectors output from said buffer before being output to said display.

16. The virtual reality headset as recited in claim 11 wherein said source driver further includes
- a plurality of amplifiers arranged to amplify said analog samples of said output vectors output from said decoder before being input into said buffer.

17. The virtual reality headset as recited in claim 11 wherein said source driver does not include a digital-to-analog converter (DAC) for purposes of converting digital pixel data to analog pixel data.

18. The virtual reality headset as recited in claim 11, wherein said analog waveform is a spread spectrum video transport (SSVT) signal, wherein said display includes C columns per decoder, wherein said sets of L output levels are received serially at a frequency freq(SSVT), wherein each of said output vectors of N analog samples are output from said decoder at a frequency freq(sample)=freq(SSVT)/N, and wherein said buffer outputs said output vectors of N analog samples in parallel at a frequency freq(line)=freq(sample)×N/C.

19. The virtual reality headset as recited in claim 11 wherein said sets of L output levels are received serially at said receiver, and wherein said each output vector of N analog samples is output in parallel from said decoder.

20. The virtual reality headset as recited in claim 11 further comprising:
a second electromagnetic pathway over which said sets of L output levels are transmitted from said headset processor as a second analog waveform, wherein said VR visor further including a second display having a second source driver that receives said sets of L output levels from said second analog waveform.

21. The virtual reality headset as recited in claim 11 wherein one of said N video samples has a value that represents a chemical odor or a haptic sensation, said VR visor further including a device to reproduce said chemical odor or said haptic sensation for a user based upon the value of one of said N analog samples corresponding to said one of said video samples.

\* \* \* \* \*